(12) United States Patent
Matsumura et al.

(10) Patent No.: US 9,171,385 B2
(45) Date of Patent: Oct. 27, 2015

(54) IMAGE PROCESSING APPARATUS CAPABLE OF DETERMINING COLOR AMOUNT, IMAGE PROCESSING METHOD, AND PROGRAM

(71) Applicant: CANON KABUSHIKI KAISHA, Tokyo (JP)

(72) Inventors: Takeshi Matsumura, Yokohama (JP); Hideyasu Tomi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 17 days.

(21) Appl. No.: 14/070,369

(22) Filed: Nov. 1, 2013

(65) Prior Publication Data

US 2014/0126809 A1    May 8, 2014

(30) Foreign Application Priority Data

Nov. 7, 2012    (JP) .................................. 2012-245648
Jan. 28, 2013    (JP) ................................ 2013-013319

(51) Int. Cl.
G06K 9/00    (2006.01)
G06T 11/00    (2006.01)
G06Q 30/02    (2012.01)
G06T 7/40    (2006.01)

(52) U.S. Cl.
CPC .............. G06T 11/001 (2013.01); G06Q 30/02 (2013.01); G06T 7/408 (2013.01)

(58) Field of Classification Search
CPC ... G06K 9/00234; G06K 9/38; G06K 9/4652; G06K 9/6289; H04N 1/00002; H04N 1/00005; H04N 1/00068; H04N 1/0084; H04N 1/00875; H04N 1/3935; H04N 1/409; H04N 1/46; H04N 1/506; H04N 1/56; H04N 1/60; H04N 1/6016; H04N 1/6058; H04N 1/6072; H04N 1/6075; H04N 1/6077; H04N 1/62; H04N 9/75; H04N 2201/0082; H04N 2201/009; H04N 2201/33328; H04N 2201/33378; G06T 7/0079; G06T 7/0081; G06T 11/001; G06T 11/40; G06T 19/20; G06T 2219/2012; G06F 3/048; G06F 8/28; G06F 17/3025; G06F 17/30722; G01J 3/462; G01J 3/463; G01J 3/52; G06Q 30/04; G06Q 30/06; G06Q 40/00
See application file for complete search history.

(56) References Cited

U.S. PATENT DOCUMENTS

| | | | | |
|---|---|---|---|---|
| 8,655,059 | B2 * | 2/2014 | Malik et al. | 382/162 |
| 8,892,466 | B2 * | 11/2014 | Malik | 705/34 |
| 8,914,311 | B2 * | 12/2014 | Malik et al. | 705/400 |
| 2012/0287487 | A1 * | 11/2012 | Nagarajan | 358/505 |

FOREIGN PATENT DOCUMENTS

| | | |
|---|---|---|
| JP | 06320955 A | 11/1994 |
| JP | 2010089486 A | 4/2010 |
| JP | 2012032668 A | 2/2012 |

* cited by examiner

*Primary Examiner* — Jose Couso
(74) *Attorney, Agent, or Firm* — Canon USA, Inc., IP Division

(57) ABSTRACT

When a printing fee is changed, if a printing fee is changed to one for a color amount that is smaller than an actual color amount of an input image, an image processing apparatus automatically performs image processing in order to maximize the color amount at the selected printing fee and prints an image processing result.

15 Claims, 21 Drawing Sheets

FIG.16

|  | NUMBER OF COLOR PIXELS | PRIORITY ORDER |
|---|---|---|
| GRAPHIC (702) | 600 | 1 |
| IMAGE (703) | 700 | 2 |
| LINE (704) | 200 | 3 |
| CHARACTER (701) | 300 | 4 |
| BACKGROUND (705) | 0 | 5 |

FIG.18

| COUNT NUMBER Ps OF ALL COLOR PIXELS | THRESHOLD VALUE 401 | DIFFERENCE Sub1 FROM THRESHOLD VALUE |
|---|---|---|
| 1800 | 1150 | 650 |

IMAGE PROCESSING APPARATUS CAPABLE OF DETERMINING COLOR AMOUNT, IMAGE PROCESSING METHOD, AND PROGRAM

BACKGROUND

1. Field

Aspects of the present invention generally relate to an image processing apparatus that can determine a color amount, an image processing method, and a program.

2. Description of the Related Art

A technique discussed in Japanese Patent Application Laid-Open No. 2012-32668 determines whether each block of an input image is a color block or a monochrome block and determines a printing fee of the input image based on the amount of the color blocks.

However, according to Japanese Patent Application Laid-Open No. 2012-32668, if the determined printing fee is dissatisfactory for a user, the user has no choice but to cancel the printing.

SUMMARY

According to an aspect of the present invention, an image processing apparatus includes a determination unit configured to determine whether a color amount of an input image is in a first segment, a second segment, or a third segment, a control unit configured to cause a display screen to display based on a segment determined by the determination unit, and an image processing unit configured to perform image processing on the input image so that the color amount of the input image is in a changed segment if an instruction to change a displayed segment is received from a user.

Further features of the present disclosure will become apparent from the following description of exemplary embodiments with reference to the attached drawings.

BRIEF DESCRIPTION OF THE DRAWINGS

FIG. 16 is a table usable in a method for counting pixels for each object.

FIG. 18 illustrates a comparison between a multistage threshold value and the number of color pixels (Part II).

DESCRIPTION OF THE EMBODIMENTS

A first exemplary embodiment will be described in detail below with reference to the drawings.

Figure 1:
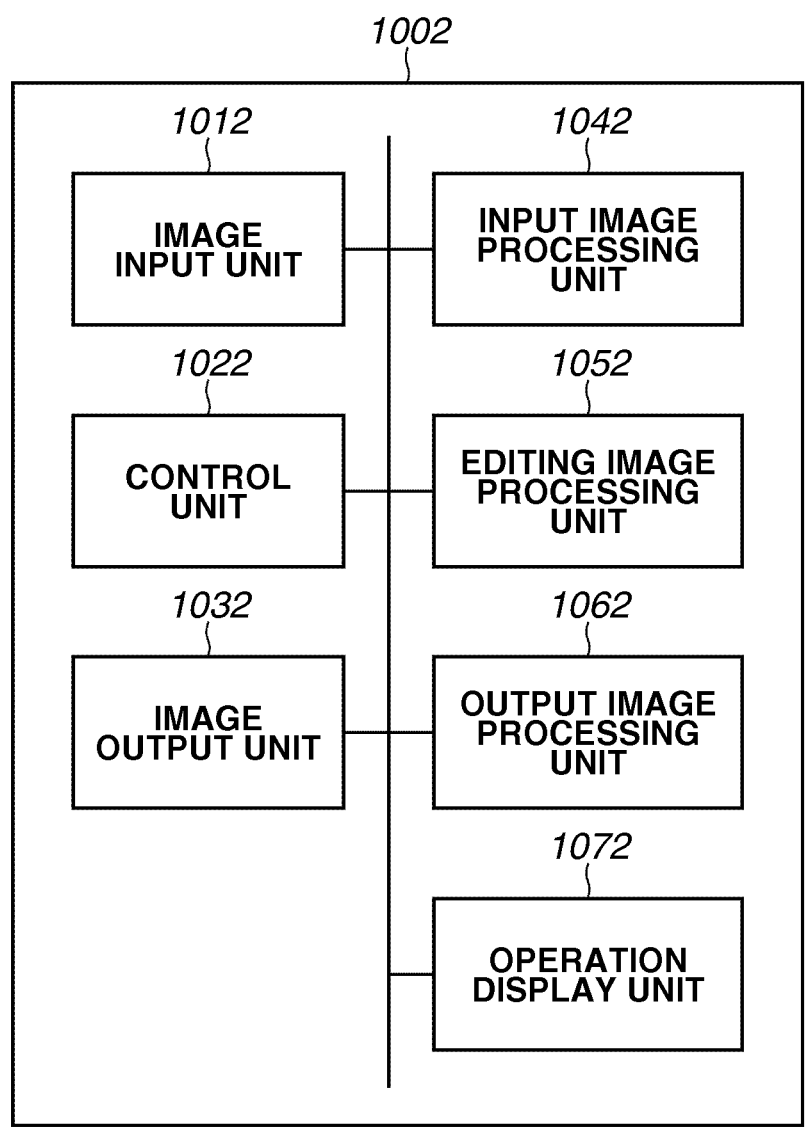
FIG. 1 is a block diagram illustrating an image forming apparatus.

FIG. 1 is a block diagram illustrating an image forming apparatus according to the present exemplary embodiment. An image forming apparatus 1002 includes an image input unit 1012, an image processing apparatus, and an image output unit 1032. The image processing apparatus includes a control unit 1022, an input image processing unit 1042, an editing image processing unit 1052, an output image processing unit 1062, and an operation display unit 1072.

The image input unit 1012 has a hardware configuration that includes a scanner and the like. The image input unit 1012 converts an image of an original document into a red-green-blue (RGB) digital image and captures the converted image. The image input unit 1012 inputs the captured RGB digital image to the input image processing unit 1042.

The control unit 1022 includes a central processing unit (CPU), a random access memory (RAM), and a read only memory (ROM). The CPU executes a program based on program data stored in the ROM by appropriately using the RAM. Processing to be performed by the control unit 1022 is described in detail below with reference to each step in flowcharts. The RAM is usable as a memory for temporarily storing RGB digital images.

The image output unit 1032 has a hardware configuration that includes a printer engine and the like. The image output unit 1032 prints an image on an output medium (e.g., paper) based on digital signals such as cyan, magenta, yellow, and black (CMYK) signals.

The input image processing unit 1042 performs predetermined image processing, which includes shading correction processing, misregistration correction processing, and image area determination processing, on an RGB digital image to be input from the image input unit 1012. The RGB digital image, after it has been subjected to the image processing performed by the input image processing unit 1042, is input to the control unit 1022.

The editing image processing unit 1052 performs various types of image processing, such as rotation, magnification, and monochromating processing on an RGB digital image input from the control unit 1022. The RGB digital image, after it has been subjected to the image processing performed by the editing image processing unit 1052, is input to the control unit 1022.

The output image processing unit 1062 performs color conversion processing on an RGB digital image input from the control unit 1022 to obtain a CMYK digital image. Further, the output image processing unit 1062 performs halftone processing on the obtained CMYK digital image. The obtained digital image is input to the image output unit 1032. If the density of each image component that constitutes the CMYK digital image is C=M=Y=0, this digital image may be referred to as a digital image of K single color.

The operation display unit 1072 has a hardware configuration that includes a liquid crystal display (LCD) touch panel and the like. The operation display unit 1072 receives an operation input by a user to the image forming apparatus 1002 and displays an announcement or an inquiry to be presented to the user from the image forming apparatus 1002. Further, the operation display unit 1072 displays an RGB digital image input from the editing image processing unit 1052 on an LCD display device.

Figure 2:
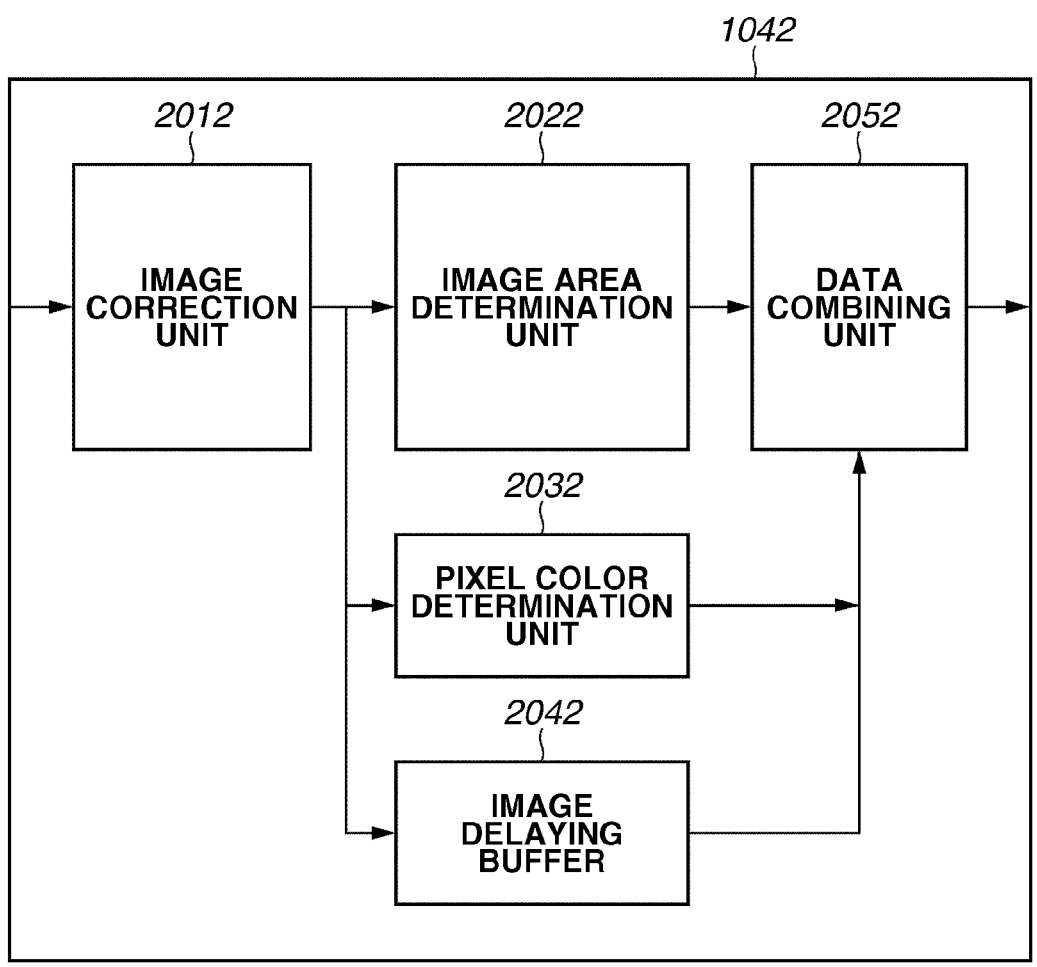
FIG. 2 is a block diagram illustrating an input image processing unit.

FIG. 2 is a block diagram illustrating an internal configuration of the input image processing unit 1042 according to the present exemplary embodiment. An image correction unit 2012 performs image correction processing, such as the shading correction processing and the misregistration correction processing, on an RGB digital image input to the input image processing unit 1042. The RGB digital image subjected to the image correction processing is input to each of an image area determination unit 2022, a pixel color determination unit 2032, and an image delaying buffer 2042.

The image area determination unit 2022 determines an image area of each pixel of the RGB digital image. A method for the image area determination is discussed, for example, in Japanese Patent Application Laid-Open No. 6-320955. The method discussed in the above-mentioned patent literature includes determining an image area of each pixel based on a contour line and an alignment of a pixel block included in an original document image. More specifically, the method includes identifying connected pixel components included in the RGB digital image and determining whether the image area of a target pixel is "character", "graphic", or "photo" based on the identified pixel components. The image area determination unit 2022 further outputs an image area flag that indicates a determination result with respect to the image area of each pixel. (For example, an image area flag takes a value ranging from 000 to 111, in which a value "100" indicates "character", a value "001" indicates "graphic", a value "010" indicates "photo", and other values indicate that an image area is not any of "character", "graphic", and "photo."

The pixel color determination unit 2032 determines whether each pixel is a color pixel or a monochrome (namely, black and white) pixel for each target pixel of the input RGB digital image. For example, the pixel determination is performed using a conventionally known algorithm in which differences between R, G, and B component values of the target pixel are calculated, then, if the largest value of the calculated differences is greater than a predetermined threshold value, the target pixel is determined as a color pixel, and if the largest value of the calculated differences is smaller than the predetermined threshold value, the target pixel is determined as a monochrome pixel. The pixel color determination unit 2032 outputs a color/monochrome flag that indicates a color/monochrome determination result of each pixel. (For example, the color/monochrome flag takes a value "0" indicating "color" and a value "1" indicating "monochrome").

The image delaying buffer 2042 delays the input RGB digital image while the image area determination unit 2022 and the pixel color determination unit 2032 perform the above-described processing.

Figure 3:
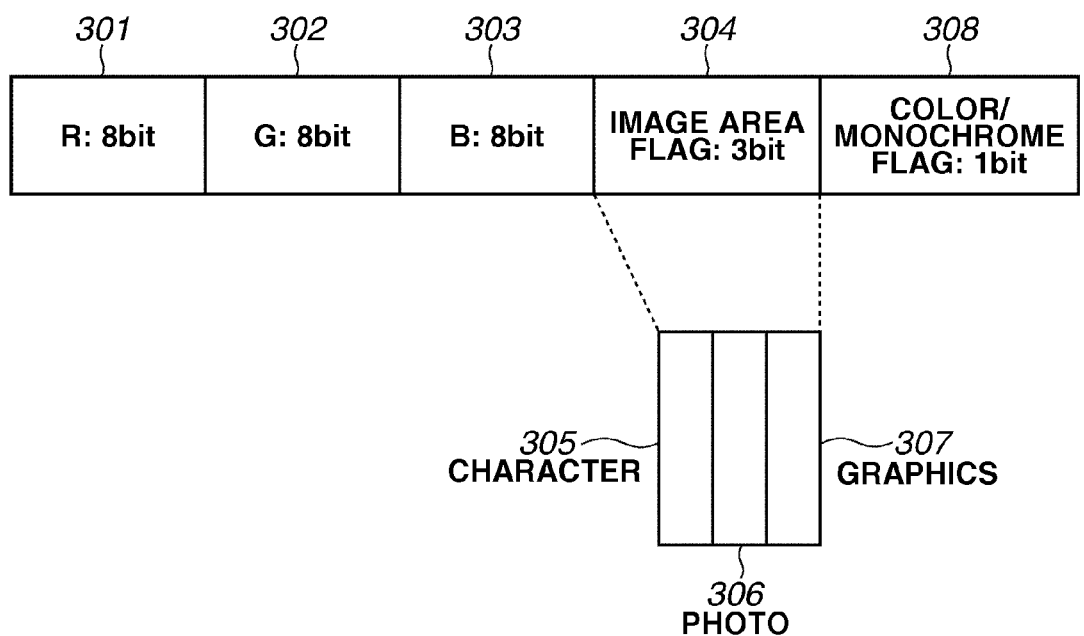
FIG. 3 illustrates a pixel data format according to a first exemplary embodiment.

A data combining unit 2052 combines the image area flag output from the image area determination unit 2022, the color/monochrome flag output from the pixel color determination unit 2032, and the RGB digital image output from the image delaying buffer 2042. In the combining processing, the data combining unit 2052 adds a corresponding image area flag and a corresponding color/monochrome flag to each pixel data. FIG. 3 illustrates a pixel format of one pixel. The pixel format includes a 3-bit image area flag 304 and a 1-bit color/monochrome flag 308 that are added to respective pixels of an 8-bit red (R) digital image 301, an 8-bit green (G) digital image 302, and an 8-bit blue (B) digital image 303 which have been processed by the input image processing unit 1042.

Figure 4:
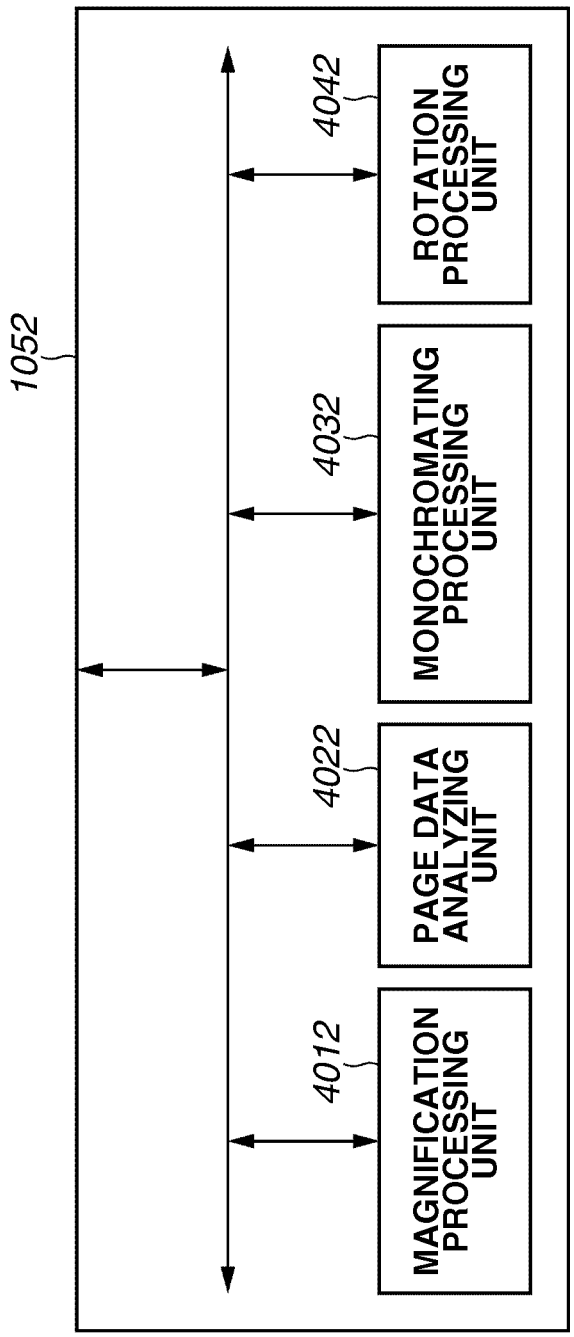
FIG. 4 is a block diagram illustrating an editing image processing unit.

FIG. 4 is a block diagram illustrating an internal configuration of the editing image processing unit 1052 in which a magnification processing unit 4012, a page data analyzing unit 4022, a monochromating processing unit 4032, and a rotation processing unit 4042 are connected with each other.

The magnification processing unit 4012 and the rotation processing unit 4042 respectively perform magnification processing and rotation processing on an RGB digital image. The page data analyzing unit 4022 performs processing on the RGB digital image to which the image area flag and the color/monochrome flag are added by the input image processing unit 1042. More specifically, the page data analyzing unit 4022 creates page image area data including the type and number of the image area flag as well as the total number and position of color pixels for each image area which are included in the RGB digital image (which corresponds to one page). The page data analyzing unit 4022 inputs the created page image area data to the control unit 1022.

Figure 5:
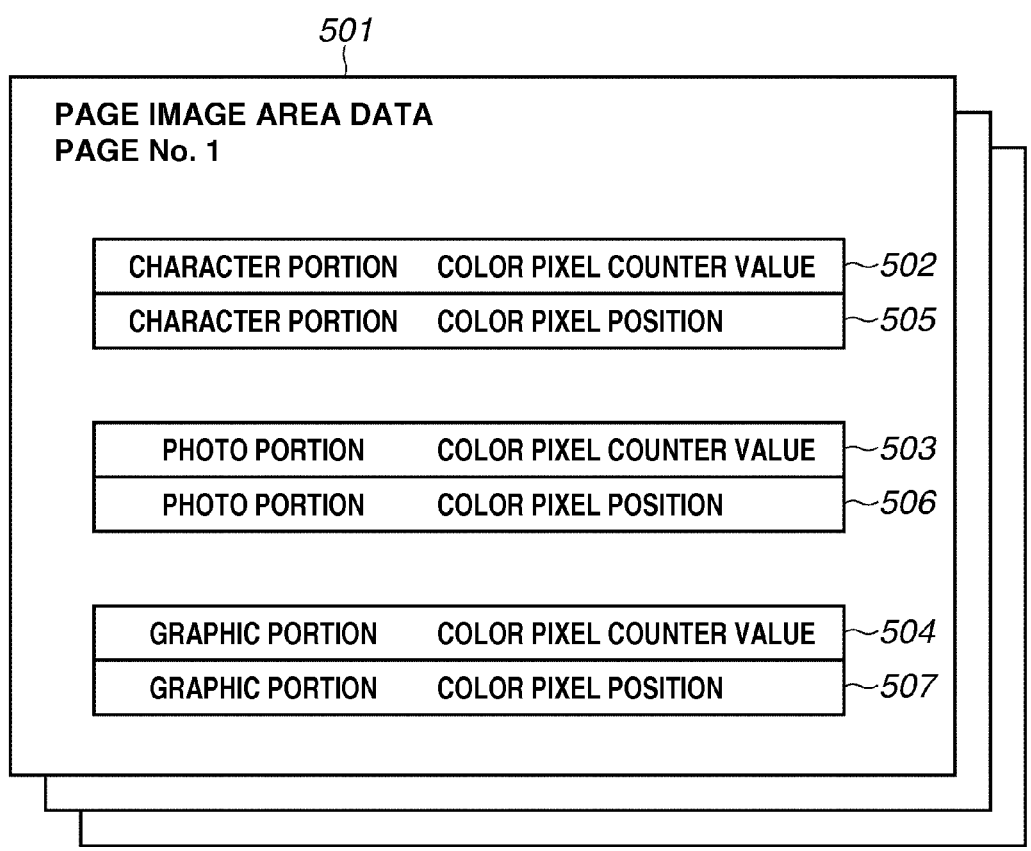
FIG. 5 illustrates page image area data according to the first exemplary embodiment.

FIG. 5 illustrates an example of page image area data 501. The page image area data 501 includes color pixel counter values 502, 503, and 504) indicating the number of color pixels and color pixel positions 505, 506, and 507) in each of the character portion, the photo portion, and the graphic portion included in a target page. The color pixel positions indicate, for example, position coordinates of RGB digital images The monochromating processing unit 4032 performs monochromating processing on an image according to a pixel position which is set to be monochromated. The monochromating processing is described in detail below with reference to a flowchart illustrating printing fee change processing.

Figure 6:
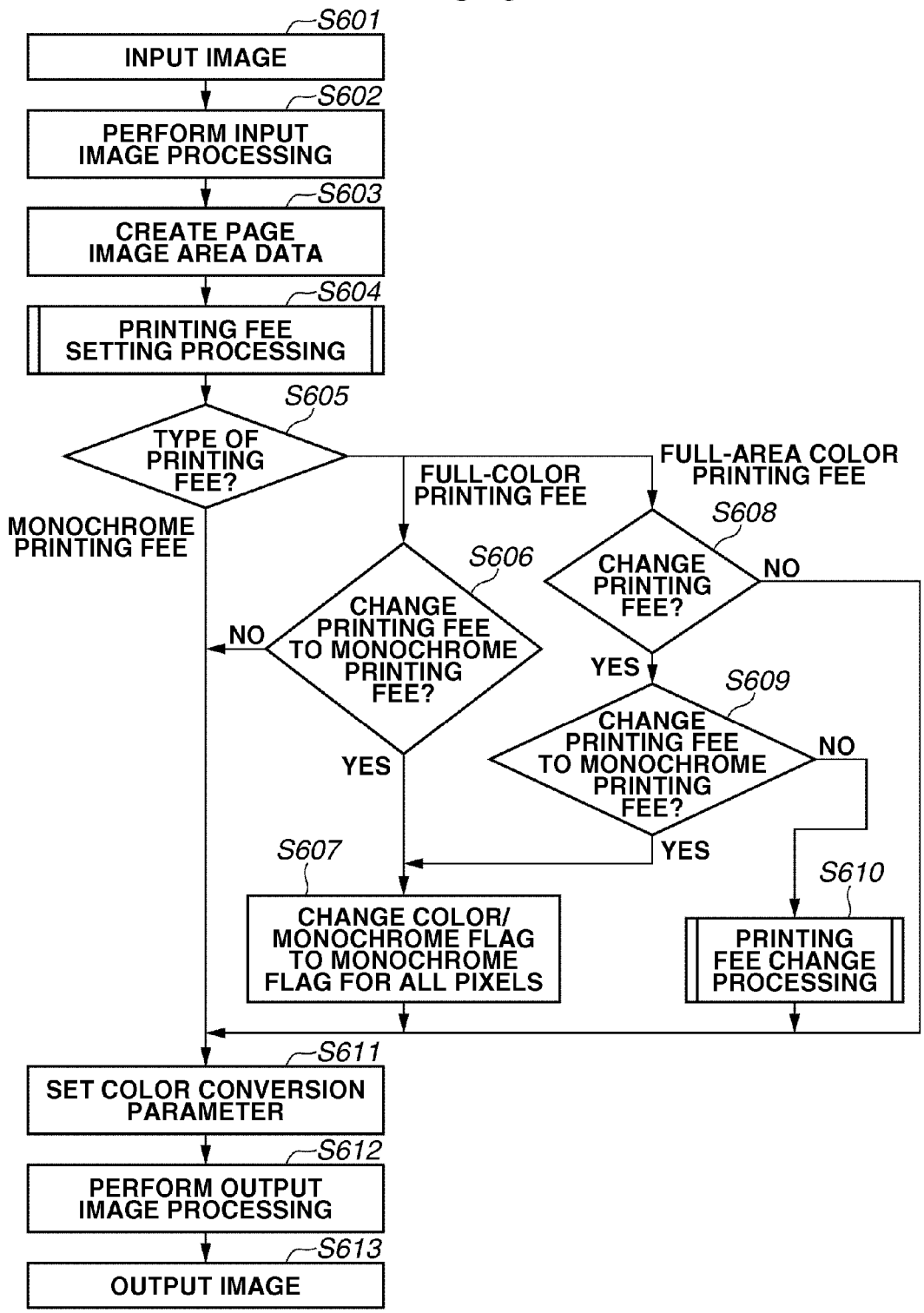
FIG. 6 is an overall flowchart illustrating a copy job operation that can be performed by the image forming apparatus.

FIG. 6 is an overall flowchart illustrating a single document copy job operation to be performed by the image forming apparatus 1002.

First, in step S601, the image input unit 1012 inputs a captured RGB digital image to the input image processing unit 1042. Then, in step S602, the input image processing unit 1042 performs the above-described predetermined image processing on the input RGB digital image. Further, the input image processing unit 1042 adds an image area flag 305, 306, and 307) and a color/monochrome flag (308) to the processed RGB digital image and inputs the flag added RGB digital image to the control unit 1022. Subsequently, the control unit 1022 inputs the RGB digital image to which the image area flag and the color/monochrome flag are added to the editing image processing unit 1052. In step S603, the editing image processing unit 1052 creates a page image area data as mentioned above. Subsequently, in step S604, the control unit 1022 performs printing fee setting processing based on the RGB digital image input from the input image processing unit 1042. The printing fee setting processing is described in detail below with reference to FIG. 7.

Next, in step S605, the control unit 1022 determines a printing fee based on a result of the printing fee setting processing in step S604. According to the present exemplary embodiment, the printing fee is selectable from three stages of monochrome printing fee (e.g., 10 yen), full-color printing fee (e.g., 20 yen), and full-area color printing fee (e.g., 40 yen). Each fee is described in detail below with reference to the flowchart illustrated in FIG. 7. However, the number of settable printing fees is not limited to three and can be set to four or more. If the determined printing fee is the monochrome printing fee, the control unit 1022 starts processing in step S611 and subsequent steps. If the determined printing fee is the full-color printing fee, then in step S606, the control unit 1022 inquires of a user via the operation display unit 1072 whether to change the printing fee to the monochrome printing fee. If the operation display unit 1072 does not receive any instruction from the user to change to the monochrome printing fee (NO in step S606), the control unit 1022 starts processing in step S611 and subsequent steps. If the operation display unit 1072 receives the instruction to change the printing fee to the monochrome printing fee (YES in step S606), then in step S607, the control unit 1022 changes the color/monochrome flag to the monochrome flag for all pixels. Further, if the determined printing fee is the full-area color printing fee, then in step S608, the control unit 1022 inquires of the user via the operation display unit 1072 whether to change the printing fee. If the operation display unit 1072 receives an instruction from the user to change the printing fee (YES in step S608), then in step S609, the control unit 1022 inquires of the user via the operation display unit 1072 whether to change the printing fee to the monochrome printing fee or to the full-color printing fee. If the operation display unit 1072 receives an instruction from the user to change the printing fee to the monochrome printing fee (YES in step S609), in step S607, the control unit 1022 changes the color/monochrome flag to the monochrome flag for all pixels. If the operation display unit 1072 does not receive an instruction to change the printing fee to the monochrome printing fee (NO in step S609), then in step S610, the control unit 1022 performs processing for changing the printing fee to the full-color printing fee. The processing to be performed in step S610 is described in detail below with reference to FIG. 8.

Next, in step S611, the control unit 1022 performs color conversion parameter settings to the output image processing unit 1062. More specifically, the control unit 1022 sets color conversion parameters dedicated to monochrome images for a pixel of which color/monochrome flag is monochrome. Whereas, the control unit 1022 sets color conversion parameters dedicated to color images for a pixel of which color/monochrome flag is color. The color conversion parameters dedicated to monochrome images are parameters usable to convert an RGB digital image into a K single-color digital image. The color conversion parameters dedicated to color images are parameters usable to change an RGB digital image to a CMYK digital image (not a K single-color digital image). In a case where R, G, and B component values of a pixel included in an RGB digital image are close to each other (namely, any one of mutual differences is equal to or less than a predetermined threshold value), it is desirable that the color conversion parameters dedicated to color images are parameters usable to convert RGB values of the pixel into a K single-color pixel. If any one of the mutual differences is greater than the predetermined threshold value, it is desirable that the color conversion parameters dedicated to color images are parameters usable to convert the RGB values of the pixel into CMYK values (any one of CMY values is not zero 0).

When the above-described processing is completed, the control unit 1022 inputs the RGB digital image received from the input image processing unit 1042 to the output image processing unit 1062.

Subsequently, the output image processing unit 1062 performs color conversion processing on the input RGB digital image using the color conversion parameters having been set as described above. Then, the output image processing unit 1062 performs halftone processing on the CMYK digital image obtained through the color conversion processing. Then, in step S612, the output image processing unit 1062 inputs a halftone processing result to the image output unit 1032.

Finally, in step S613, the image output unit 1032 prints the input image (i.e., the image processing result obtained through the image processing including the color conversion processing and the halftone processing).

Figure 7:
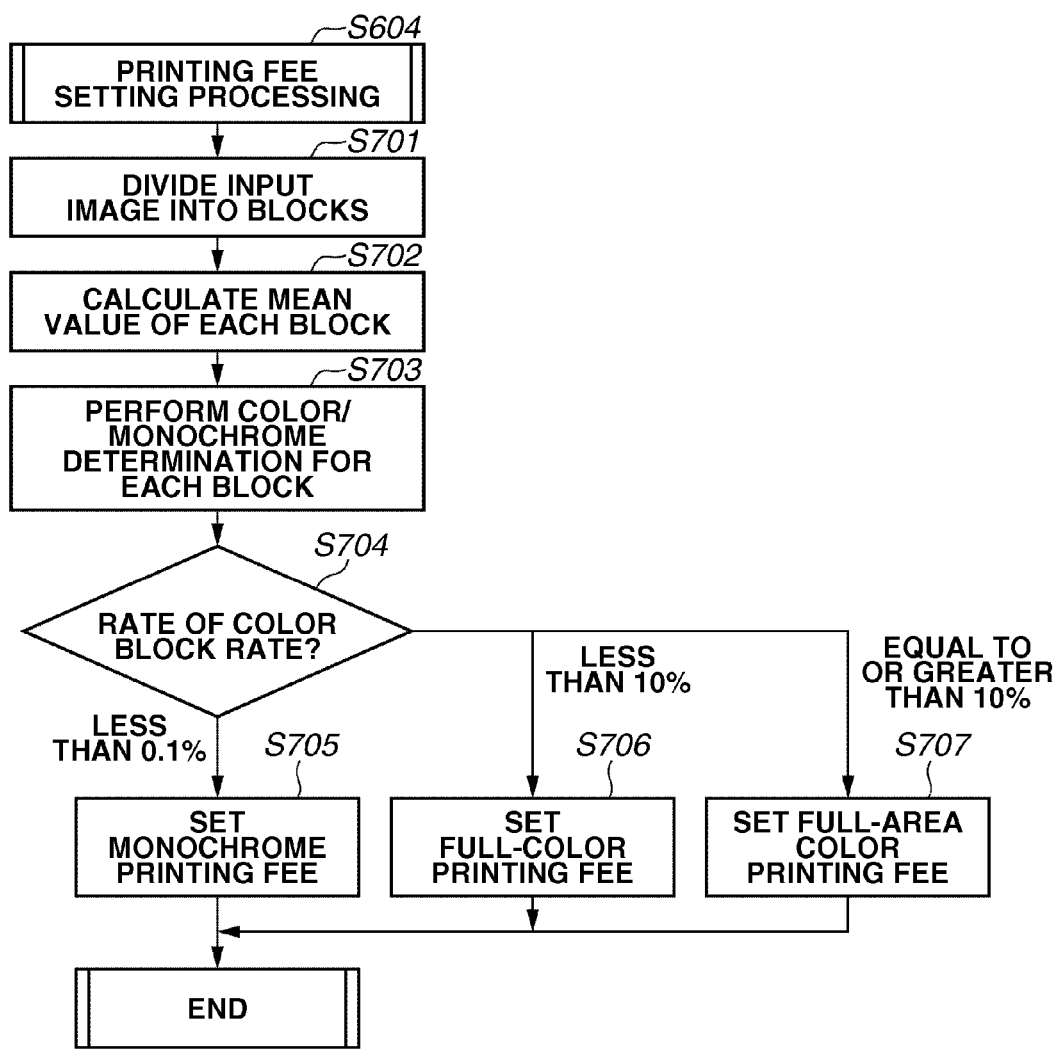
FIG. 7 is a flowchart illustrating details of printing fee setting processing.

FIG. 7 is a flowchart illustrating details of the printing fee setting processing in step S604 illustrated in FIG. 6.

In the printing fee setting processing in step S604, first in step S701, the control unit 1022 divides the input RGB digital image into a plurality of blocks. Then, in step S702, the control unit 1022 calculates mean RGB luminance values of each block. In the following description, it is presumed that each block is an area composed of 32 pixels×32 pixels. However, each block can have any other size. Further, it is presumed that the values calculated in the present exemplary embodiment are the mean RGB luminance values, however, it is useful to calculate weighted mean values or any other values.

Next, in step S703, the control unit 1022 determines whether each block is a color block or a monochrome block based on the calculated mean value. For example, the control unit 1022 perform determination using a conventional algorithm in which differences between R, G, and B components that constitute the mean RGB luminance values of the target block are calculated, then if the largest difference value (this value may be referred to as "color difference") is greater than a predetermined threshold value, the target pixel is determined as a color pixel and if the largest difference value is smaller than the predetermined threshold value, the target pixel is determined as a monochrome pixel.

The determination algorithm is not limited to the above-described algorithm. For example, a method may be employed which converts an RGB luminance value into a YUV luminance value, obtains a sum of square of a U component and square of a V component (the sum is a general color difference), and compare the obtained sum with a threshold value. There are various color difference determination methods and any method is employable.

Subsequently, in step S704, the control unit 1022 counts the number of blocks that have been determined as color blocks and divides the counted number by the number of blocks included in the input image. Thus, the control unit 1022 calculates a rate of the color blocks included in the entire blocks. If the calculated color block rate is in a first segment "less than a first threshold value (=0.1%)" (LESS THAN 0.1% in step S704), then in step S705, the control unit 1022 sets the monochrome printing fee (e.g., 10 yen) as the printing fee for the image. If the calculated color block rate is in a second segment "equal to or greater than the first threshold value and less than a second threshold value (=10%)" (LESS THAN 10% in step S704), then in step S706, the control unit 1022 sets the full-color printing fee (e.g., 20 yen) as the printing fee for the image. If the calculated color block rate is in a third segment "equal to or greater than the second threshold value" (EQUAL TO OR GREATER THAN 10% in step S704), then in step S707, the control unit 1022 sets the full-area color printing fee (e.g., 40 yen) as the printing fee for the image. The present exemplary embodiment is described using the threshold values 0.1% and 10% as examples, however, the threshold values can be any other appropriate values as long as the second threshold value is greater than the first threshold value. The control unit 1022 stores the calculated color block rate in the control unit 1022.

As described above, the control unit 1022 not only classifies images into monochrome images and color images but also further classifies the color images into full-color images and full-area color images according to the color block rate, in a setting of the printing fee. The control unit 1022 may cause the operation display unit 1072 to display the printing fee in the above-described printing fee setting processing in step S604.

Further, the classification of color images does not have to be specified by the color block rate. The classification of color images may be based on the number of color blocks. In measuring the color amount, using the number of color blocks is a mere example. The number of color pixels or any other numerical value for measuring the color amount can be used.

A thumbnail image can be formed by collecting mean values of respective blocks obtained in step S702. In the display for printing fee information, the control unit 1022 may cause the operation display unit 1072 to display a preview image that includes the obtained thumbnail image together with the printing fee information.

Figure 8:
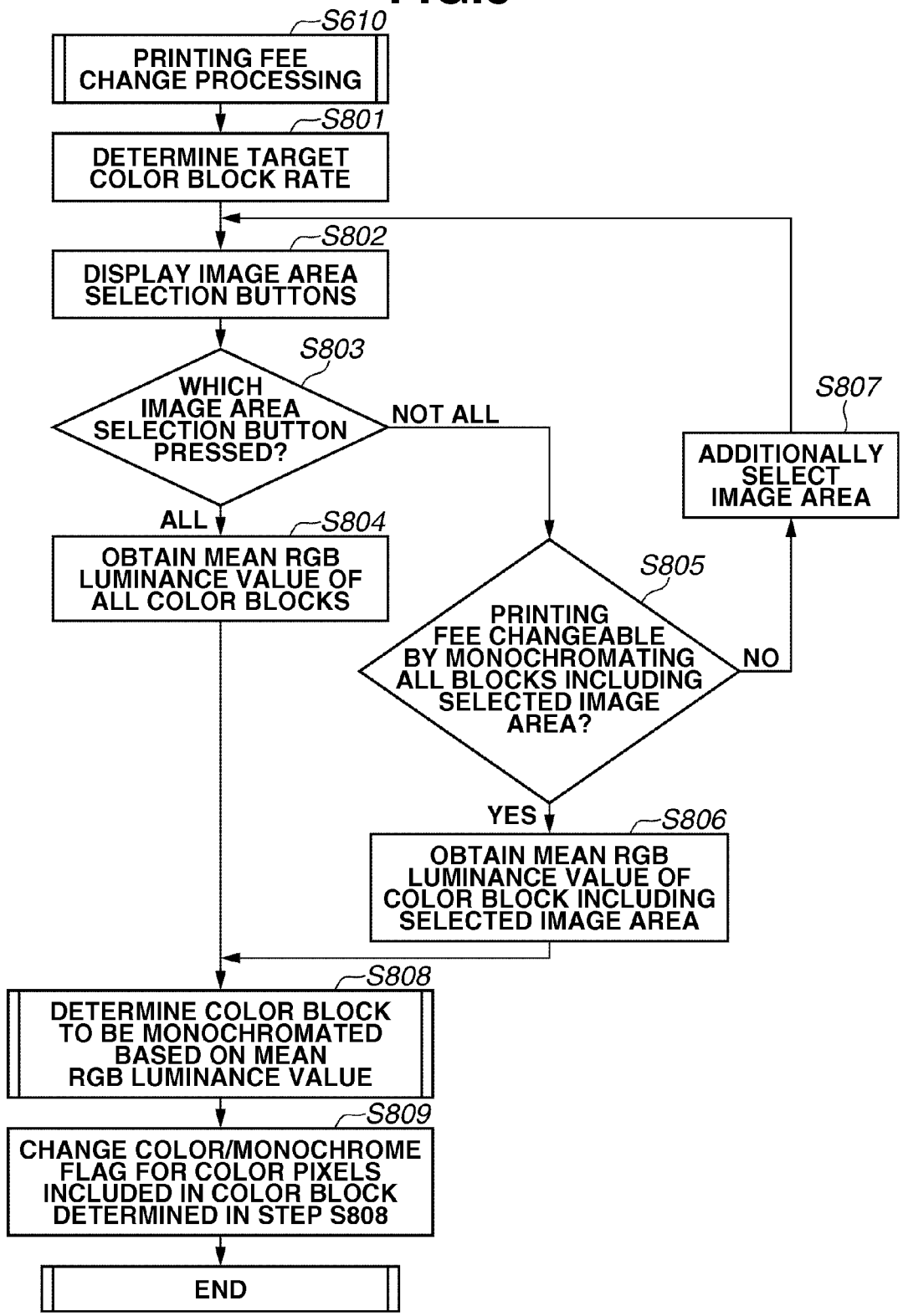
FIG. 8 is a flowchart illustrating details of fee change processing according to the first exemplary embodiment.

FIG. 8 is a flowchart illustrating details of the printing fee change processing to be performed in step S610 illustrated in FIG. 6. In the present exemplary embodiment, it is presumed that an RGB digital image as a target to be subjected to the printing fee change processing has an image size of 320 pixels×320 pixels and a color block rate of 20%.

First, in step S801, the control unit 1022 determines a target color block rate. The target color block rate is a value adjacent to the second threshold value. For example, the target color block rate (e.g., the largest color block rate in the full-color printing fee), is a value less than the second threshold value and nearer to the second threshold value than the first threshold value. The largest color block rate in the full-color printing fee is, for example, 9% which is the largest value that is less than the second threshold value (=10%). The color block rate calculated in step S704 and stored in the control unit 1022 is used as a pre-change color block rate. The target color block rate is variable depending on the image size of each RGB digital image and the second threshold value (e.g., 10% in the present exemplary embodiment) that indicates the color block rate at which the printing fee is set to the full-color printing fee as described with reference to FIG. 7.

Next, in step S802, the control unit 1022 causes the operation display unit 1072 to display image area selection buttons to enable the user to select an image area that can be monochromated. The control unit 1022 displays buttons that enables the user to select an image area of which color pixel count value is not zero, with reference to the color pixel counter values 502, 503, and 504) included in the page image area data 501. The image area selection buttons to be displayed include an "all" button which allows all color blocks to be monochromated. In addition, the image area selection buttons include a "character" button and a "photo" button, and the user can select multiple buttons therefrom to instruct monochromating color blocks including a "character" image area and a "photo" image area.

In step S803, the control unit 1022 identifies the image area selection button pressed by the user. If the pressed image area selection button is the "all" button (ALL in step S803), then in step S804, the control unit 1022 acquires mean RGB luminance values of all color blocks. Alternatively, the mean RGB luminance values of color blocks determined in step S703 may be stored in the control unit 1022, and in step S804, the control unit 1022 may acquire the stored mean RGB luminance values. In this case, the pressed button is the "all" button, so that the monochromating processing is executable for all color blocks. Then, the control unit 1022 starts processing in step S808 and subsequent steps.

If the pressed button is not the "all" button (NOT ALL in step S803), and then in step S805, the control unit 1022 determines whether the printing fee is changeable by monochromating all color blocks including the selected image area. More specifically, the color block rate obtainable after removing color blocks including the selected image area is smaller than the target color block rate determined in step S801, the control unit 1022 determines that the printing fee is changeable. The color block including the selected image area is a block that includes the color pixel positions 505, 506, and 507) of the page image area data 501. If the printing fee is changeable (YES in step S805), then in step S806, the control unit 1022 acquires mean RGB luminance values of the color block including the selected image area. Then, the control unit 1022 starts processing in step S808 and subsequent steps. In step S805, if it is determined that the printing fee is unchangeable (NO in step S805), then in step S807, the control unit 1022 performs processing for additionally selecting an image area that can be monochromated. For example, the control unit 1022 causes the operation display unit 1072 to announce a message that prompts the user to select an additional image area. Subsequently, the operation returns to step S802 in which the control unit 1022 causes the operation display unit 1072 to display image area selection buttons. In addition, the button already selected may be displayed in a different color from other image area selection buttons and in an unselectable state, so that the user can intuitively understand which image area selection button is already selected. As described above, in step S802, it is useful to switch the display of the image area selection buttons with reference to information indicating the selected image area stored beforehand in the control unit 1022.

Next, in step S808, the control unit 1022 determines color blocks to be monochromated with reference to the pre-change color block rate (20% in the present exemplary embodiment) of the RGB digital image and the changed target color block rate (9% in the present exemplary embodiment). The processing to be performed in step S808 is described in detail below with reference to FIG. 9.

Next, in step S809, the control unit 1022 changes the color/monochrome flag to the monochrome flag for color pixels (i.e., pixels to which color flags are attached) included in the color blocks to be monochromated determined in step S808. In step S611, the control unit 1022 performs color conversion parameter settings for the output image processing unit 1062 with reference to the color/monochrome flag changed in step S809.

Figure 9:
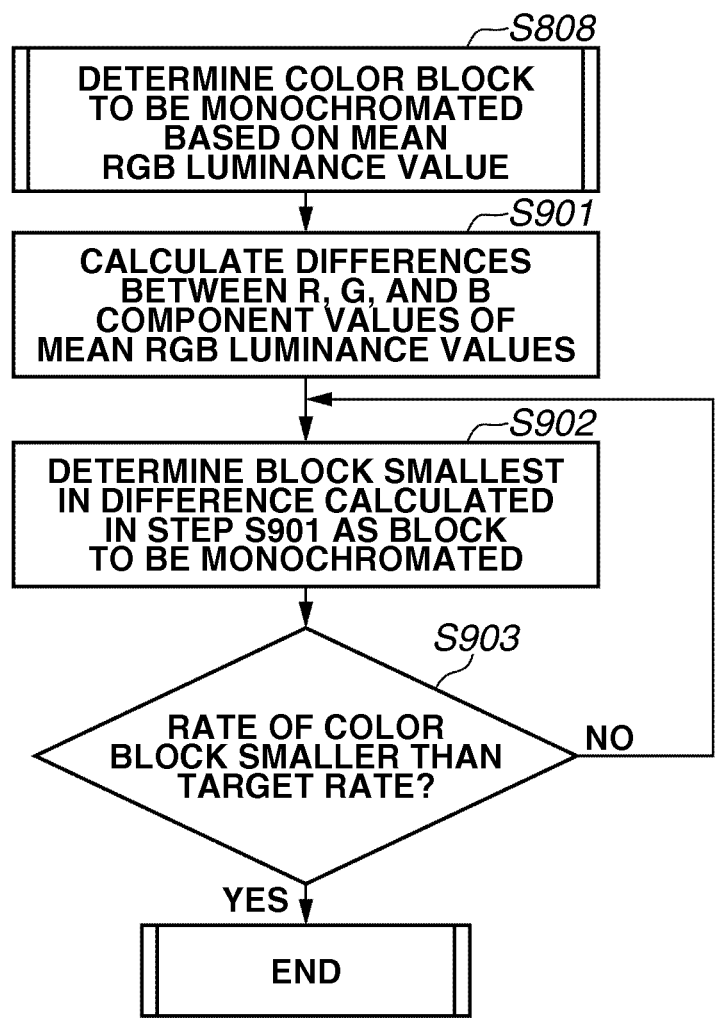
FIG. 9 is a flowchart illustrating details of processing for determining color blocks to be monochromated according to the first exemplary embodiment.

An algorithm for determining a color block to be monochromated, which uses a mean RGB luminance of a target color block, is described in detail below with reference to FIG. 9. According to the algorithm, first in step S901, the control unit 1022 calculates differences between R, G, and B component values of the mean RGB luminance of the color block acquired in step S804 or step S806. Next, in step S902, the control unit 1022 determines a block smallest in the difference as a block to be monochromated. Next, in step S903, the control unit 1022 determines whether the color block rate obtainable after removing the block determined in step S902 is smaller than the target color block rate determined in step S801. If it is determined that the obtained color block rate is smaller than the target color block rate (YES in step S903), the control unit 1022 terminates the processing in the flowchart illustrated in FIG. 9. If it is determined that the obtained color block rate is not smaller than the target color block rate (NO in step S903), the operation returns to step S902. The control unit 1022 monochromates a block smallest in the differences between R, G, and B component values that constitute the mean RGB luminance value, among blocks remaining after removing blocks determined to be monochromated. As described above, the control unit 1022 may store information about the block having been subjected to the monochromating processing and then, in step S902, determines the block to be monochromated with reference to the stored information. The control unit 1022 repeats the processing in steps S902 and S903 until the obtained color block rate becomes smaller than the target color block rate. In the present exemplary embodiment, the control unit 1022 determines eleven blocks to be monochromated in order of smallness with respect to the differences between R, G, and B component values so that the number of color blocks becomes nine.

The control unit 1022 may cause the operation display unit 1072 to perform preview display of the RGB digital image after the printing fee has been changed. The control unit 1022 performs pixel position settings for the monochromating processing unit 4032 based on the position of the color pixel of which color/monochrome flag has been changed through the printing fee change processing in step S610. Next, the control unit 1022 outputs the RGB digital image to the editing image processing unit 1052. The monochromating processing unit 4032 performs monochromating processing according to the following procedure. The monochromating processing unit 4032 converts the RGB luminance of each pixel of the input RGB digital image into a YUV space. Then, the monochromating processing unit 4032 converts a Y component value of the converted YUV space into each component value of the RGB luminance, and generates an RGB digital image. Accordingly, R, G, and B component values of the converted RGB digital image have the same values. Through the above-described processing, a monochromated RGB digital image is generated. The monochromating processing unit 4032 outputs the generated RGB digital image to each of the magnification processing unit 4012 and the rotation processing unit 4042. The magnification processing unit 4012 and the rotation processing unit 4042 respectively perform magnification processing and rotation processing according to the resolution of the LCD display device mounted on the operation display unit 1072 and the orientation of the RGB digital image to be preview displayed, to generate a preview image. Subsequently, the control unit 1022 inputs the preview image processed by the editing image processing unit 1052 to the operation display unit 1072. The operation display unit 1072 displays a preview of the RGB digital image obtained through the printing fee change processing. The control unit 1022 causes the operation display unit 1072 to perform the preview display for the RGB digital image obtained through the printing fee change processing at an appropriate step following step S809 for example. Further, it is useful to confirm if the user wants to print the preview displayed image. For example, the control unit 1022 causes the operation display unit 1072 to display an OK button (not illustrated) to enable the user to press the OK button to perform printing. Thus, the user can easily confirm the image obtained through the printing fee change processing. This is effective to prevent a printing-related failure from occurring.

Further, the control unit 1022 may cause the operation display unit 1072 to display the preview image of the printing fee changed RGB digital image generated though the above-described method in comparison with a preview image of the printing fee non-changed RGB digital image. The preview image of the printing fee non-changed RGB digital image can be generated according to the following procedure. The control unit 1022 inputs the RGB digital image processed by the input image processing unit 1042 in step S602 to the editing image processing unit 1052. The magnification processing unit 4012 and the rotation processing unit 4042 respectively perform magnification processing and rotation processing according to the resolution of the LCD display device mounted on the operation display unit 1072 and the orientation of the RGB digital image to be preview displayed, to generate the preview image. The operation display unit 1072 receives the preview images generated in the above-described manners and performs a comparative display of two preview images. Thus, the user can easily confirm the image obtainable through the printing fee change processing. This is further effective to prevent a printing-related failure from occurring.

According to the present exemplary embodiment, the printing fee change processing includes determining an image area to be monochromated in response to a user's instruction with respect to the image area selection. However, an area to be monochromated may be determined in response to a user's area instruction and then printing fee change and printing may be performed. According to this processing, the image processing apparatus determines the pixel position for the monochromating processing in which the number of color pixels can be maximized at the same printing fee based on the area selected by the user. Further, if the selected area is insufficient, it is useful to prompt the user to designate an additional area. Thus, the user can obtain a printed image that includes the maximum number of color pixels at the same printing fee while maintaining the color of a necessary area.

Further, in the printing fee change processing, a color object to be monochromated may be determined in response to a user's color object selection, and then printing fee change and printing may be performed. The image forming apparatus 1002 automatically extracts, as a color object, a pixel group including color pixels having similar characteristics, such as "character", "graphic", and "photo", and positioned adjacent to each other in an image. According to this processing, the image processing apparatus determines the pixel position for the monochromating processing in which the number of color pixels can be maximized at the same printing fee based on the color object selected by the user. Thus, the user can obtain a printed image that includes the maximum number of color pixels at the same printing fee while maintaining the color of a necessary color object.

Further, in the printing fee change processing, it is useful to cause a user to select a color to be monochromated. As a color selection method, it is useful to enable a user to select a color that has a predetermined range in saturation, density, and luminance, instead of selecting a specific single color. For example, it is useful to enable a user to select a "color similar to red" instead of selecting "red." Thus, the user can obtain a printed image that includes the maximum number of color pixels at the same printing fee while maintaining the necessary color.

Further, the present embodiment can be realized by executing the following processing. More specifically, software (a program) for realizing the functions of the above exemplary embodiments is supplied to a system or an apparatus via a network or various storage media and a computer (or a CPU or a micro processing unit (MPU)) of the system or the apparatus reads and executes the program.

As described above, a user selects an image area to be monochromated when a printing fee is changed. The image processing apparatus performs monochromating processing based on the selected printing fee and the selected image area in such a way as to maximize the color amount at the same printing fee. Thus, the image processing apparatus can print an image which includes the maximum number of color pixels at the same printing fee while maintaining the color of the necessary image area. According to the above-described exemplary embodiment, a user selects an image area. However, the image processing apparatus may cause a user to select an area and monochromate color pixels included in the selected area.

Further, according to the present exemplary embodiment, an example in which a fee is displayed on a display screen is described. Alternatively, it is useful to simply display a color amount (e.g., a color block rate) or a corresponding segment.

According to the first exemplary embodiment, the image processing apparatus determines an image area to be monochromated in response to a user's instruction with respect to the image area selection in the printing fee change processing and determines a pixel position to be monochromated. According to a second exemplary embodiment, for the purpose of simplifying user's operation, an image processing apparatus displays a preview image after the printing fee has been changed in the printing fee change processing, and printing is performed when the user selects a preview image.

The image processing apparatus according to the present exemplary embodiment has a configuration similar to that described in the first exemplary embodiment, and therefore redundant description thereof will be avoided.

Figure 10:
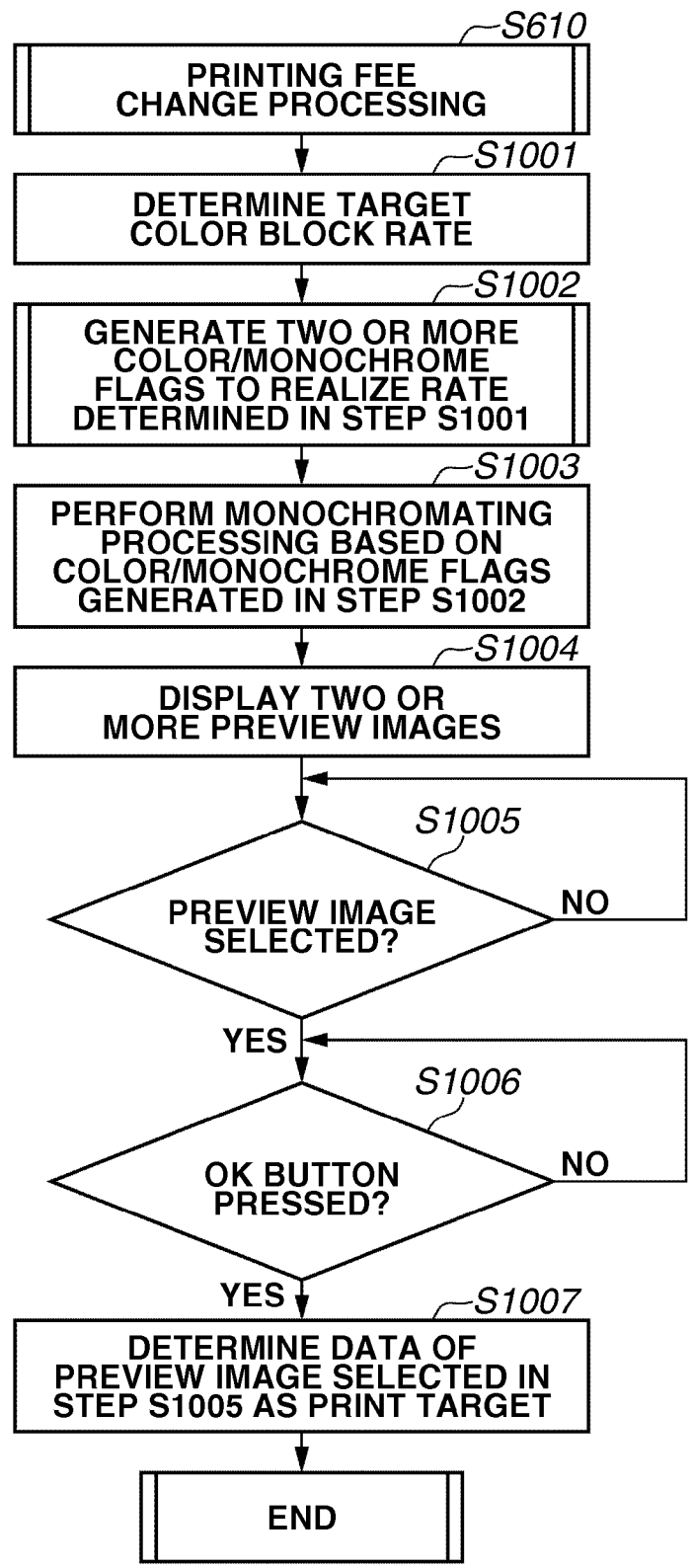
FIG. 10 is a flowchart illustrating details of fee change processing according to a second exemplary embodiment.

Printing fee change processing according to the present exemplary embodiment is described in detail below with reference to a flowchart illustrated in FIG. 10. In the present exemplary embodiment, it is presumed that an RGB digital image as a target to be subjected to the printing fee change processing has an image size of 320 pixels×320 pixels and a color block rate of 12%. Further, the rate of the color blocks each including only a character image area is 4%, the rate of color blocks each including only a photo image area is 4%, and the rate of color blocks each including only a graphic area is 4%.

Figure 11:
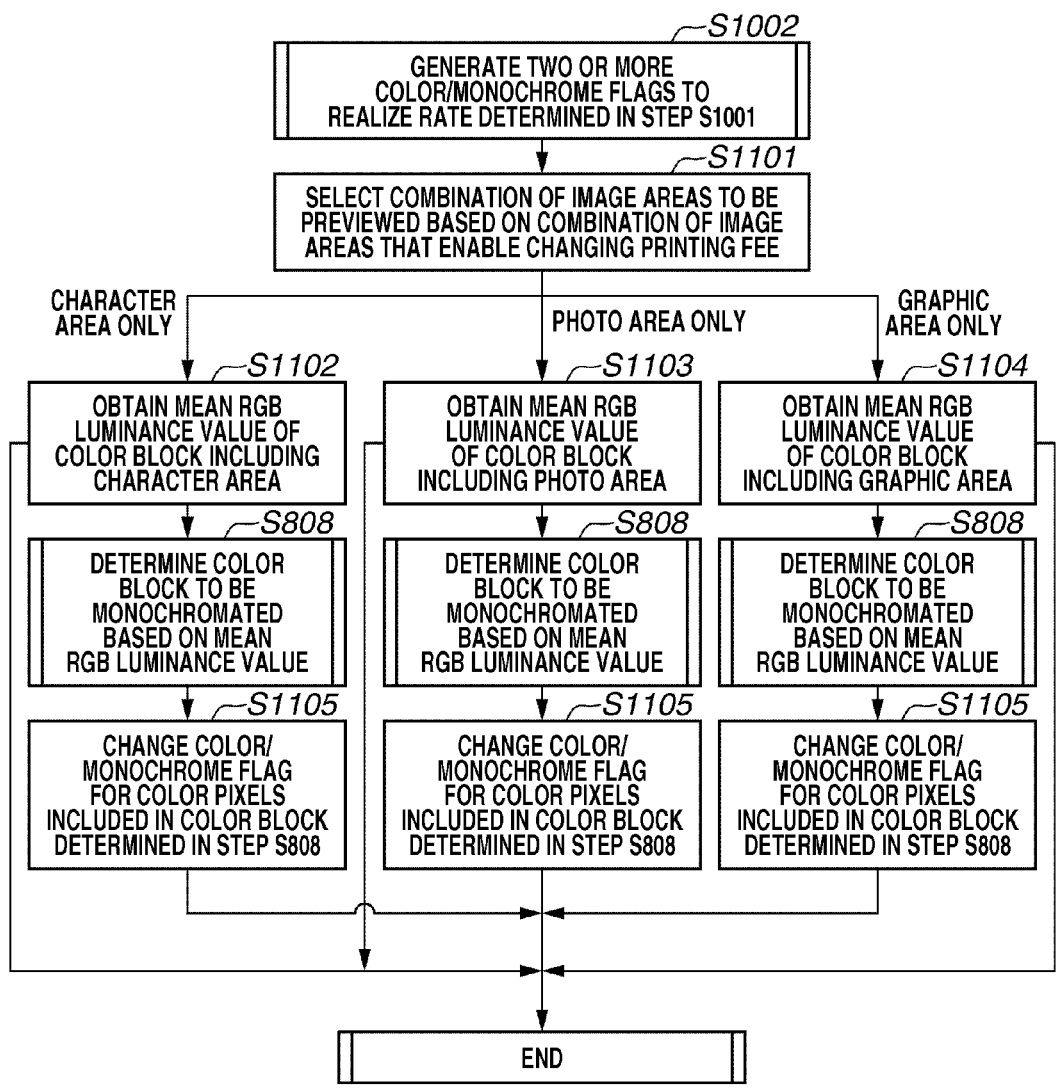
FIG. 11 is a flowchart illustrating details of color/monochrome flag generation processing according to the second exemplary embodiment.

In the printing fee change processing in step S610, first in step S1001, the control unit 1022 determines a target color block rate. In the present exemplary embodiment, the image size is 320 pixels×320 pixels and the target color block rate to be set after the change processing is 9% which is the largest value less than 10%. Next, in step S1002, the control unit 1022 generates a plurality of color/monochrome flags that correspond to one page to realize the color block rate determined in step S1001. The color/monochrome flag generation processing in step S1002 is described in detail below with reference to FIG. 11.

In the color/monochrome flag generation processing in step S1002, first in step S1101, the control unit 1022 selects a combination of image areas for which preview images are generated. The control unit 1022 selects a combination of image areas for which preview images are generated, based on a predetermined algorithm, from combinations of image areas of which printing fee is changeable. Based on the above-described conditions set in the present exemplary embodiment, the following seven combinations can be extracted as the combinations of image areas of which printing fee are changeable. They are combinations of "character image area only", "photo image area only", "graphic image area only", "character image area or photo image area", "character image area or graphic image area", "photo image area or graphic image area", and "all image areas." The combination to be preview displayed is selected from the above-described seven combinations. According to the algorithm employed in the present exemplary embodiment, the control unit 1022 selects three combinations each being smaller in the number of image area types, as the combination to be preview displayed. If the included image areas are the same type, the control unit 1022 selects the combination to be preview displayed based on the priority order allocated to each image area stored in the control unit 1022. Alternatively, the control unit 1022 may cause a user to set the priority order for each image area via the operation display unit 1072. According to the above-described algorithm employed in the present exemplary embodiment, the control unit 1022 selects three combinations of "character image area only", "photo image area only", and "graphic image area only." Next, the control unit 1022 determines color blocks to be monochromated in each selected combination. In the case of "character image area only", in step S1102, the control unit 1022 acquires mean RGB luminance values of color blocks each including a character image area. In the case of "photo image area only", in step S1103, the control unit 1022 acquires mean RGB luminance values of color blocks each including a photo image area. In the case of "graphic image areas only", in step S1104, the control unit 1022 acquires mean RGB luminance values of color blocks each including a graphic image area. Next, in step S808, the control unit 1022 determines color blocks to be monochromated in each of the three selected combinations. An algorithm employed in the present exemplary embodiment to determine the color blocks to be monochromated is similar to that described in the first exemplary embodiment. As a result, the color blocks to be monochromated can be determined for each of the three selected combinations. Next, in step S1105, the control unit 1022 changes the color/monochrome flag to "monochrome" for each color pixel included in the color blocks to be monochromated which is determined in step S808. The control unit 1022 performs processing on the color/monochrome flags of the RGB digital image input from the input image processing unit 1042 stored in the control unit 1022. As a result, three color/monochrome flags are generated for one changed page.

Figure 12:
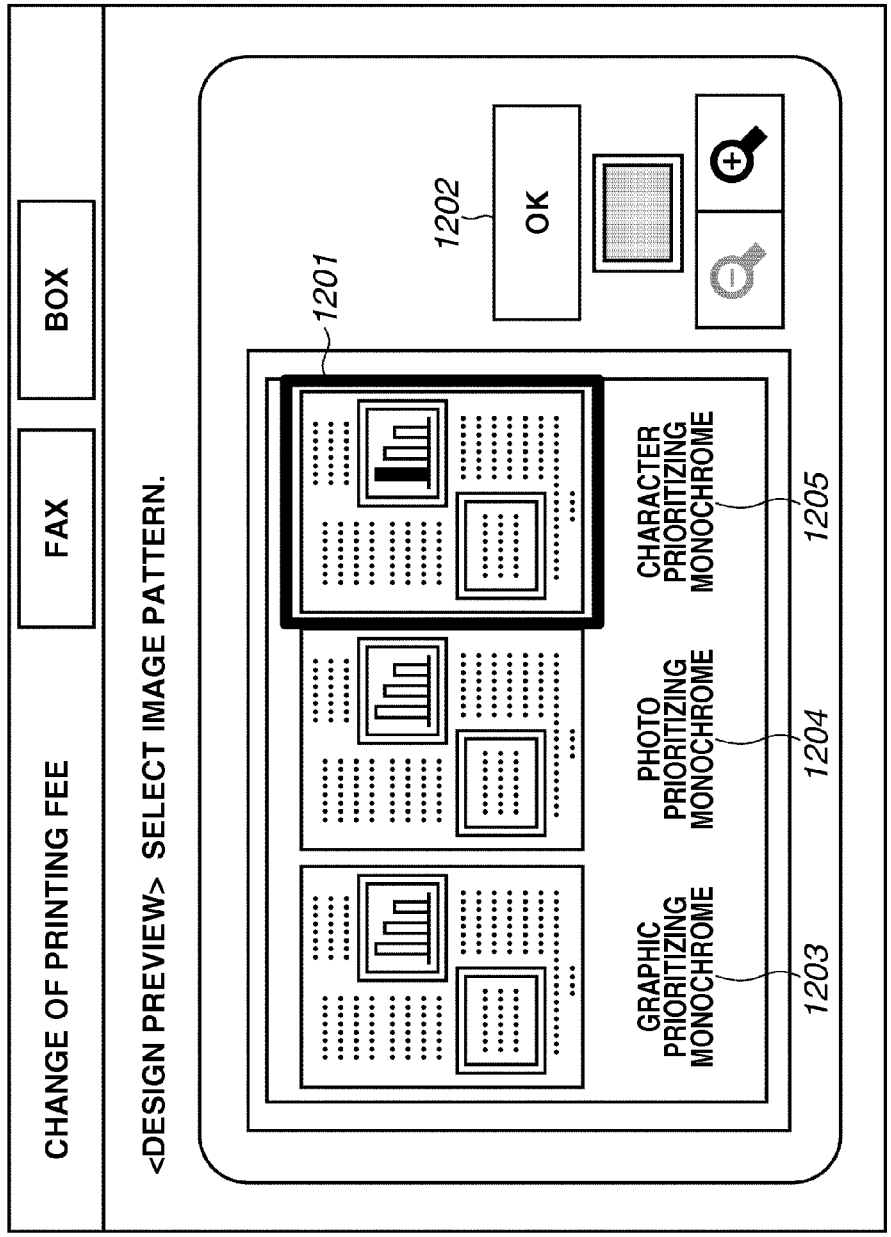
FIG. 12 illustrates a display example on an operation display unit to be displayed in response to a selection of a preview image according to the second exemplary embodiment.

Referring back to the printing fee change processing in step S610, in step S1003, the control unit 1022 performs monochromating processing and preview image processing based on the three color/monochrome flags generated in step S1002. The control unit 1022 performs pixel position settings for the monochromating processing unit 4032 based on the position of each color pixel of which color/monochrome flag has been changed. Next, the control unit 1022 inputs the RGB digital image to the editing image processing unit 1052. The monochromating processing unit 4032 performs monochromating processing on the received RGB digital image. The monochromating processing unit 4032 outputs the processed RGB digital image to each of the magnification processing unit 4012 and the rotation processing unit 4042. The magnification processing unit 4012 and the rotation processing unit 4042 respectively perform magnification processing and rotation processing according to the resolution of the LCD display device mounted on the operation display unit 1072 and the orientation of the RGB digital image to be preview displayed, to generate preview images. Subsequently, the control unit 1022 inputs the preview images processed by the editing image processing unit 1052 to the operation display unit 1072. In step S1004, the operation display unit 1072 displays previews of three RGB digital images obtainable through the printing fee change processing. FIG. 12 illustrates an example of a screen to be displayed by the operation display unit 1072 to enable a user to select a preview image of a printing target from a plurality of preview images. At the time when the above-described preview image display has been completed, the operation display unit 1072 displays a designation frame 1201 as illustrated in FIG. 12 and waits until one of the displayed preview images is selected. Information about processing pattern used in the creation of each preview image may be displayed below the image as indicated by items 1203, 1204, and 1205 in FIG. 12.

If a user wants to execute the printing fee change processing to output an image, the user moves the designation frame 1201 and presses an OK button 1202. In step S1005, the control unit 1022 determines whether the user has selected the preview image via the operation display unit 1072. Then, in step S1006, the control unit 1022 determines whether the OK button 1202 is pressed. If it is determined that the OK button 1202 is pressed (YES in step S1006), then in step S1007, the control unit 1022 determines the data of the preview image selected in step S1005 as print target data. The control unit 1022 performs processing in step S611 and subsequent steps using the color/monochrome flag determined in step S1007.

According to the present exemplary embodiment, in the printing fee change processing, the control unit 1022 automatically generates color/monochrome flags, the each flag corresponding to one page to enable a user to select a desired one of the generated preview images. Alternatively, the control unit 1022 may perform the following processing. That is, in the printing fee change processing, the control unit 1022 can automatically generate a single color/monochrome flag that corresponds to one page to perform printing without any selection by a user. According to the above-described processing, the user can easily change the printing fee and start printing because the processing for selecting a preview image (in step S1005) and the approval of printing (in step S1006) can be skipped. In addition, the processing load of the image forming apparatus 1002 can be reduced because the processing for creating a plurality of color/monochrome flags that correspond to one page (in step S1002) and the processing for generating and displaying a plurality of preview images (in steps S1003 and S1004) become unnecessary.

As described above, the printing fee change processing includes extracting a representative page that can most appropriately display a pattern for monochromating processing from image data and generating a processing pattern for the monochromating processing with reference to the number of image areas in the representative page as well as the presence (or the number) of color pixels. Further, the processing includes determining the pixel position that corresponds to the generated pattern and displaying a plurality of preview images of representative pages obtainable through the monochromating processing. Thus, compared to the first exemplary embodiment, a user can easily select an image processing pattern that is closest to an intended one from a plurality of preview images and can print the selected image, because the processing for selecting an image area to be monochromated is eliminated.

Figure 13:
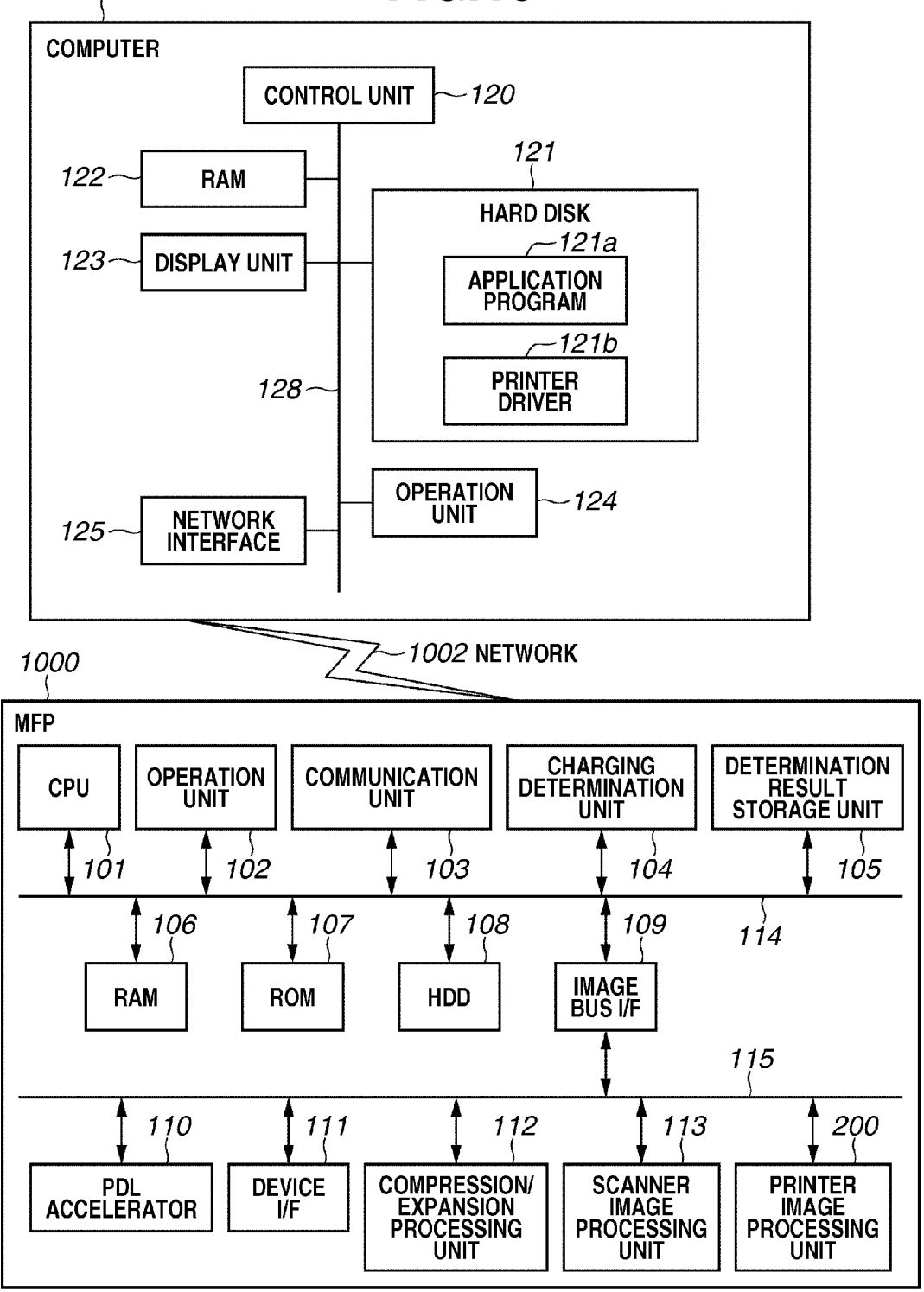
FIG. 13 illustrates an example of a system configuration for a printing system.

FIG. 13 illustrates an example of a system configuration for a printing system.

First, a configuration of a multifunction peripheral (MFP) 1000 is described below. The MFP 1000 is an example of the image forming apparatus.

A CPU 101 functions as a controller that controls the entire system.

An operation unit 102 functions as an input device and an interface (I/F) that are used when a user operates the MFP 1000.

A communication unit 103 functions as a communication I/F that connects the MFP 1000 to a local area network (LAN) or a wide area network (WAN), to perform data input/output and modulation/demodulation processing.

A charging determination unit 104 determines a charging fee by collating the number of color pixels included in a unit page counted and calculated by a printer image processing unit 200 with correspondence data between the number of color pixels and the charging level stored in a RAM 106 or a ROM 107.

A determination result storage unit 105 is a nonvolatile memory and is usable as a memory that stores a result determined by the charging determination unit 104.

The RAM 106 is a system work memory that is used when the CPU 101 operates. The RAM 106 is also usable as a memory that temporarily stores various data.

The ROM 107 is usable as a boot memory which stores a boot program for the MFP 1000.

A hard disk drive (HDD) 108 stores data pieces, such as system software, image data, and an address book. The image data is encoded by a compression/expansion processing unit 112, which is described below, when it is stored, and is restored when it is used. If a device is not equipped with the HDD, the image data is stored in another storage medium (e.g., a flash memory).

The above-described constituent components are connected to a system bus 114.

According to the present exemplary embodiment, the charging determination unit 104 is described a hardware device. However, the charging determination unit 104 can be installed on the MFP 1000 as software that can be realized by the CPU 101 that executes a program stored in the ROM 107 or the HDD 108.

An image bus I/F 109 is a bus bridge that can convert a data structure and connect the system bus 114 to an image bus 115 that can speedily transfer image data.

The image bus 115 is constituted by a high speed bus (e.g., PCI bus or IEEE1394).

A page description language (PDL) accelerator 110 can develop a PDL code into a bit-map image.

A device I/F 111 is an interface connected to an image input/output device, e.g., a scanner and a printer, to perform synchronous/asynchronous conversion of image data.

A compression/expansion processing unit 112 compresses each of image data and edge data, which is described below, using a predetermined compression method.

A scanner image processing unit 113 performs correction, modification, and editing processing on input image data.

The printer image processing unit 200 performs correction and resolution conversion processing on printout image data so that the printout image data can be appropriately processed by the printer. The printer image processing unit 200 is described in detail below.

Next, a computer 1001 includes a control unit 120 that functions as a control center, a hard disk 121 that stores computer programs or the like relating to control procedures of the control unit 120, and a RAM 122 that temporarily stores various data pieces generated by the control unit 120 during control operations.

The computer 1001 further includes a display unit 123 including an LCD or a cathode ray tube (CRT) display device, an operation unit 124 including a keyboard and a mouse, and a network interface 125 that can communicate with an external device via a network.

More specifically, the control unit 120 is constituted by a central processing unit (CPU) or the like. The control unit 120 controls the above-described each hardware units of the computer 1001 via a bus 128. Further, the control unit 120 executes processing based on the computer programs stored in the hard disk 121.

Various programs which are necessary when the computer 1001 operates are stored in the hard disk 121. The programs stored in the hard disk 121 include an application program 121a that is usable to create, for example, documents, figures, and photos, and a printer driver 121b that is usable to create a print job to be transmitted to the MFP 1000.

The print job to be created by the control unit 120 that executes the printer driver 121b includes print conditions, such as a paper size, multi-up printing, two-sided printing, and staple stitch direction. Further, the print job includes print data created by a user using the application program 121a. The print data is described, for example, using a page description language (PDL).

The MFP 1000 and the computer 1001 can perform data transmission and reception via a network 1002.

Figure 14:
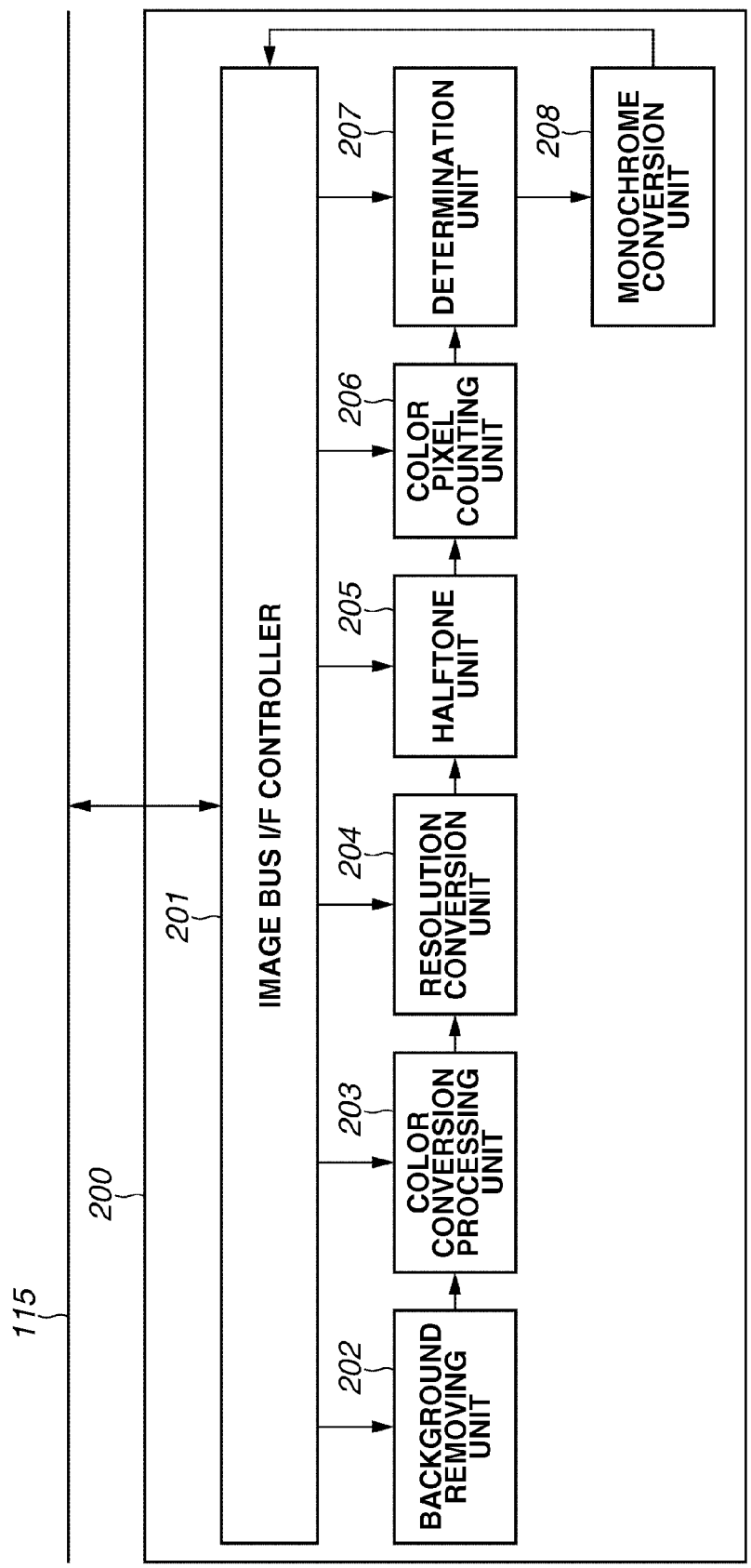
FIG. 14 illustrates an example of a configuration of a printer image processing unit.

Subsequently, a configuration of the printer image processing unit 200 according to the present exemplary embodiment is described in detail below with reference to FIG. 14.

An image bus I/F controller 201 connects the printer image processing unit 200 to the image bus 115. The image bus I/F controller 201 can control a bus access sequence and generate timing signals to control each device provided in the printer image processing unit 200.

A background removing unit 202 removes a background color if image data read from an original document with a light color background is transmitted.

A color conversion processing unit 203 performs color conversion processing according to output characteristics of the printer.

A resolution conversion unit 204 performs resolution conversion processing to convert the resolution of the color converted image data into a value appropriate for an output device.

A halftone unit 205 modifies the input image into a binary image or a multi-valued image using a dither method, an error diffusion method, and the like.

A color pixel counting unit 206 integrates color pixels included in each object by performing a pixel-by-pixel basis counting operation based on the input object flag and notify a determination unit 207 of an integrated result. An integration method is described in detail below.

The determination unit 207 determines a pixel to be subjected to monochrome conversion with reference to information transmitted from the color pixel counting unit 206, a multistage threshold value having been set beforehand, and a range value from the multistage threshold value. The determination unit 207 transmits information about the determined pixel. A determination method is described in detail below.

A monochrome conversion unit 208 performs monochrome conversion on a designated pixel based on information from the determination unit 207 and outputs a converted result to the image bus I/F controller 201.

Next, print control processing according to the present exemplary embodiment is described in detail below with reference to a flowchart illustrated in FIG. 15. Each processing described in the present exemplary embodiment can be implemented as hardware processing performed by a hardware device, such as an application specific integrated circuit (ASIC) or a field programmable gate array (FPGA), or implemented as software processing performed by the CPU 101. Unless it is specifically mentioned, the print control processing described in the present exemplary embodiment is the hardware processing. Further, values of a charging amount and a charging rate used in the present exemplary embodiment are mere examples. Users can arbitrarily set these values via the operation unit 102 considering actual situations.

In response to a designation received via the operation unit 124 of the computer 1001, the CPU 101 generates a print job by processing according to the application program 121a and the printer driver 121b.

In step S301, PDL data is transferred to the MFP 1000 via the network 1002 and the network interface 125. In the MFP 1000, the communication unit 103 transmits the transferred PDL data to the PDL accelerator 110 via the system bus 114 and the image bus 115. The PDL accelerator 110 converts the PDL data into a raster data.

In step S302, the compression/expansion processing unit 112 compresses the converted raster data received via the image bus 115. Then, the compressed raster data is stored in the HDD 108 and transferred to the printer image processing unit 200. The printer image processing unit 200 performs processing that is determined to be necessary. The color pixel counting unit 206 calculates the number of color pixels that are included in the raster data for each object.

A method for counting the number of pixels for each object is described in detail below with reference to FIG. 16. The raster data generated by the PDL accelerator 110 includes pixel data and an image area flag indicating which object the pixel belongs for each pixel. The color pixel counting unit 206 counts the number of color pixels for each object with reference to the image area flag and the pixel data. FIG. 16 illustrates an example of a counting result in which the color pixels are classified into five types of image areas.

The determination unit 207 determines whether each pixel is a color pixel and identifies an object to which the color pixel belongs, and calculates an integrated value as illustrated in FIG. 16.

The determination unit 207 compares the number of color pixels with a multistage threshold value.

Figure 17:
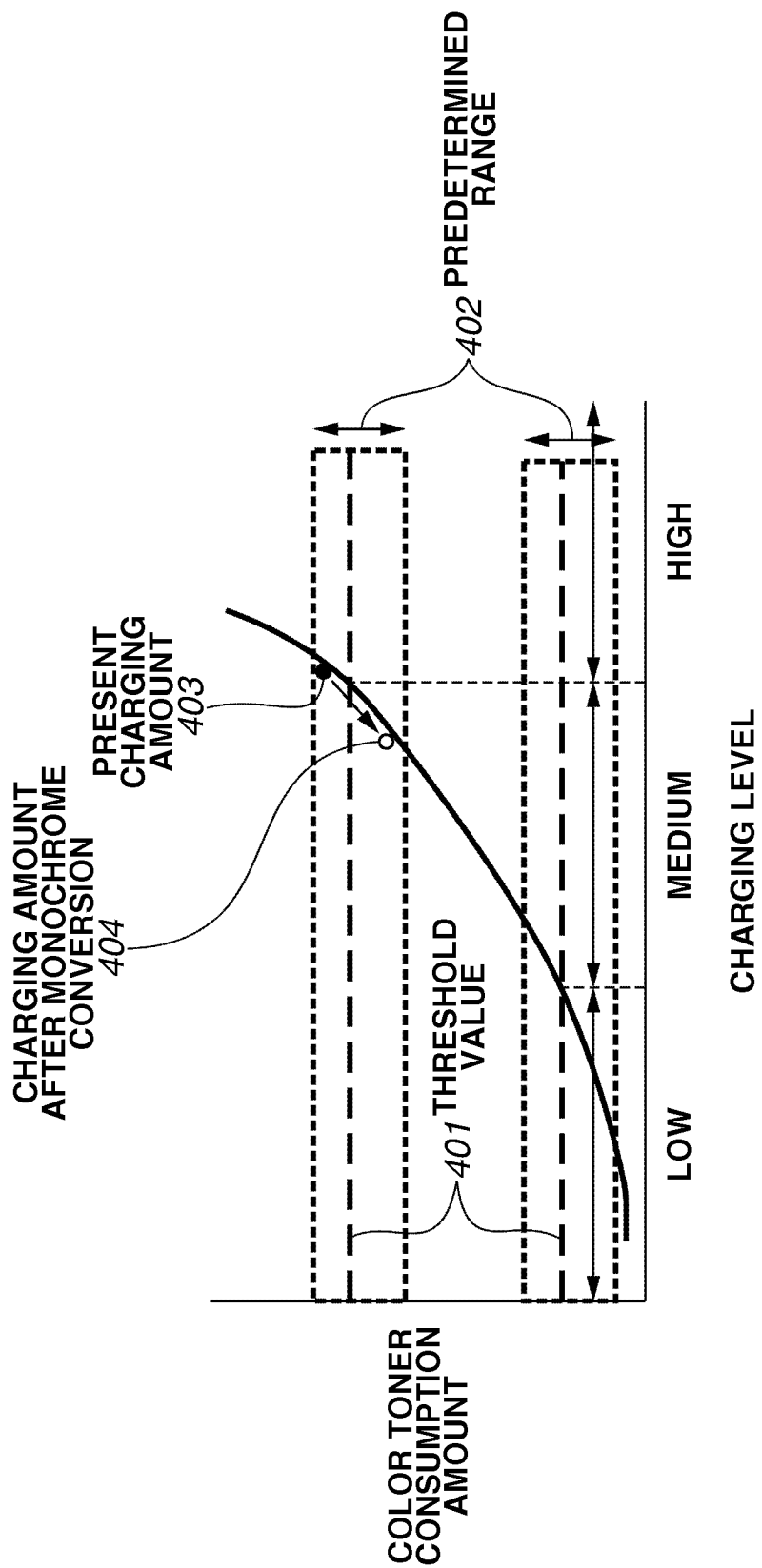
FIG. 17 illustrates a comparison between a multistage threshold value and the number of color pixels (Part I).

A comparison method is described in detail below with reference to FIGS. 17 and 18.

In step S303, the determination unit 207 receives a threshold value 401, which is one of multistage threshold values stored beforehand in the HDD 108, and a value indicating a predetermined range 402 from the threshold value 401, as values to be referred to.

Subsequently, in step S304, the determination unit 207 calculates a difference (Sub1) by comparing the count number Ps of all color pixels and the threshold value 401 with reference to color pixel count information transmitted from the color pixel counting unit 206. For example, according to an example illustrated in FIG. 18, the count number Ps of all color pixels is 1800. The threshold value 401 closest to the count number Ps, which is one of the multistage threshold values, is 1150. Accordingly, the difference (Sub1) is 650.

Next, in step S305, the determination unit 207 determines whether the difference (Sub1) is within the predetermined range 402. If the predetermined range 402 is 700, the difference (Sub1) is within the predetermined range 402 (YES in step S305). Therefore, in step S306, the determination unit 207 starts evaluating the change of print data (i.e., the change in print contents).

In step S307, with reference to the difference (Sub1) from the threshold value and the number of color pixels for each object, the determination unit 207 determines an object including color pixels to be monochromated so that the count number of all color pixels becomes equal to or less than the threshold value 401.

In FIG. 16, the number of color pixels having image attribute 703 is 700. Therefore, the determination unit 207 determines that the number of all color pixels becomes equal to or less than the threshold value if the color pixel having the image attribute is monochromated.

In this processing, if the number of color pixels of a plurality of objects is larger than the difference (Sub1), the determination unit 207 may determine an object including color pixels to be monochromated based on the priority orders thereof.

Further, the determination unit 207 determines whether the charging level is decreased by monochromating the above-described color pixels. If the determination unit 207 determines that the charging level is decreased by monochromating the above-described color pixels (YES in step S307), the operation proceeds to step S308. If the determination unit 207 determines that the charging level is not decreased by monochromating the above-described color pixels (NO in step S307), the operation proceeds to step S313.

In this case, the determination unit 207 may successively determine whether the charging level is decreased by monochromating an object other than the color pixels based on the priority order.

Next, in step S308, the monochrome conversion unit 208 exclusively converts the color pixels having the image attribute determined in step S307 into monochrome pixels.

Figure 19:
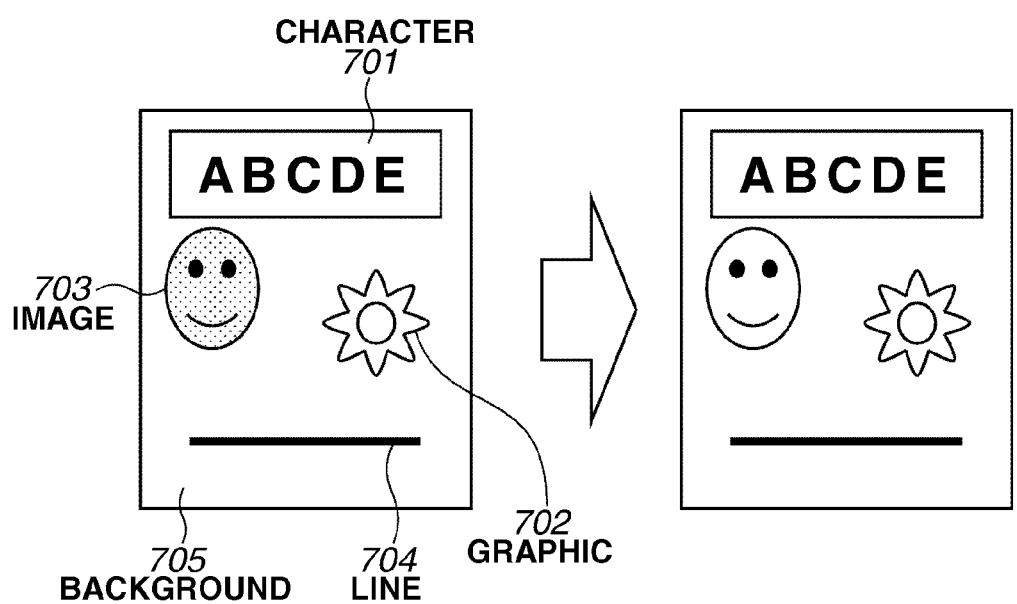
FIG. 19 illustrates an example of data having been subjected to monochrome conversion.

In step S309, the CPU 101 displays the data having been subjected to the monochrome conversion processing on the display unit 123 of the computer 1001 via the image bus I/F controller 201, the image bus 115, the system bus 114, and the network 1002. FIG. 19 illustrates an example of the data having been subjected to the monochrome conversion processing.

Figure 20:
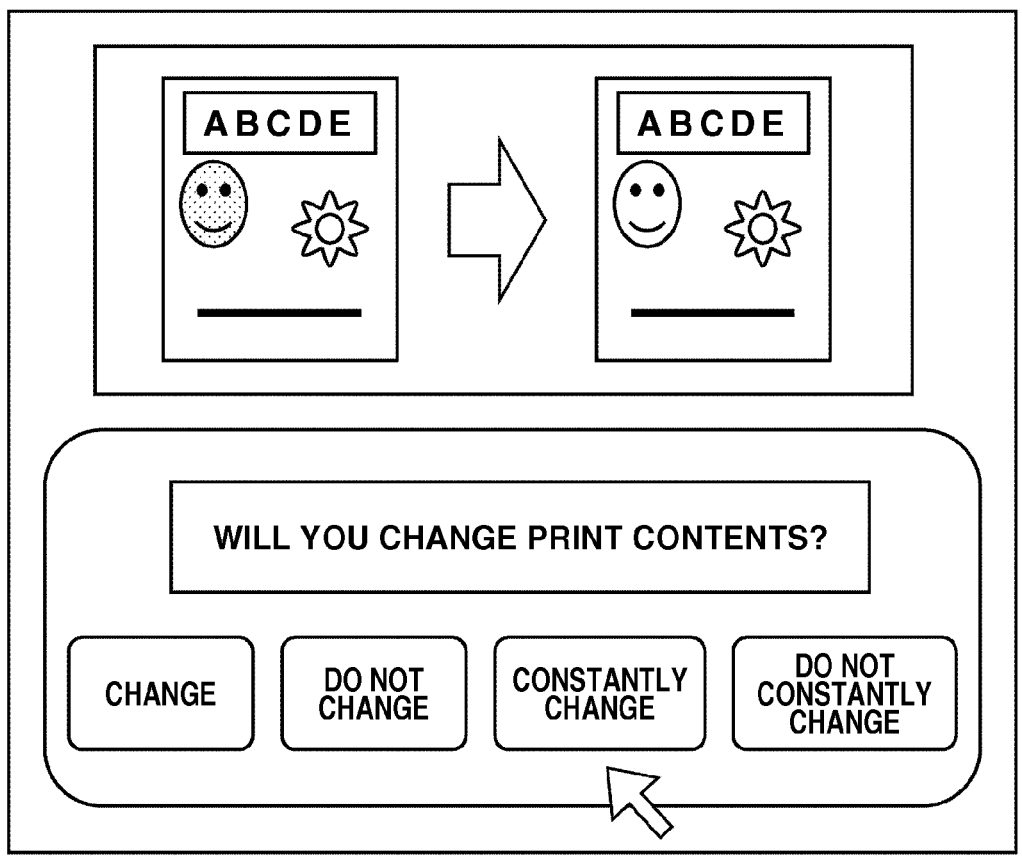
FIG. 20 illustrates an example of an inquiry screen.

Together with the data displayed in step S309, in step S310, the CPU 101 causes the display unit 123 to display an inquiry as illustrated in FIG. 20 to prompt a user to determine whether to perform printing based on the changed data. The CPU 101 determines to perform printing based on the changed data based on an operation input by the user. According to the present exemplary embodiment, the inquiry screen illustrated in FIG. 20 is displayed on the display unit 123 to make an inquiry to a user. However, the present exemplary embodiment may be configured to automatically convert color pixels into monochrome pixels and output the converted pixel data according to settings without making an inquiry to the user.

If it is determined that the user requests printing based on the changed data (YES in step S310), then in step S311, the CPU 101 stores a numerical value indicating the number of color pixels changed by the determination unit 207 in the determination result storage unit 105.

When prompting the user to perform determination, the CPU 101 can add an inquiry about changing in each data. In addition, the CPU 101 can obtain determination all together as illustrated in FIG. 20. Further, if a predetermined time elapses in the determination processing in step S310, the CPU 101 may forcibly terminate the processing in the flowchart illustrated in FIG. 15 and start printing based on the non-changed data on the assumption that the user wish to perform printing with the non-changed data.

In step S313, the CPU 101 performs control in such a way as to print the data monochromated in step S308 via the device I/F 111 after the numerical value indicating the number of color pixels has been updated.

Next, an operation to be performed in step S310 when the user does not determine to perform monochrome conversion after confirming the data subjected to the monochrome conversion processing is described below.

In step S312, the determination unit 207 confirms whether any candidate to be next converted is present, using the non-changed data stored in the HDD 108 again.

For example, the determination unit 207 performs the monochrome conversion on two objects of graphic 702 and line 704 as next candidates. Alternatively, the determination unit 207 performs the monochrome conversion on two objects of graphic 702 and character 701 as candidates.

If the user selects an option "do not constantly change" in the determination processing in step S310, the conversion of monochrome pixels is not performed, and the non-changed data is used in the processing in step S313.

Figure 15:
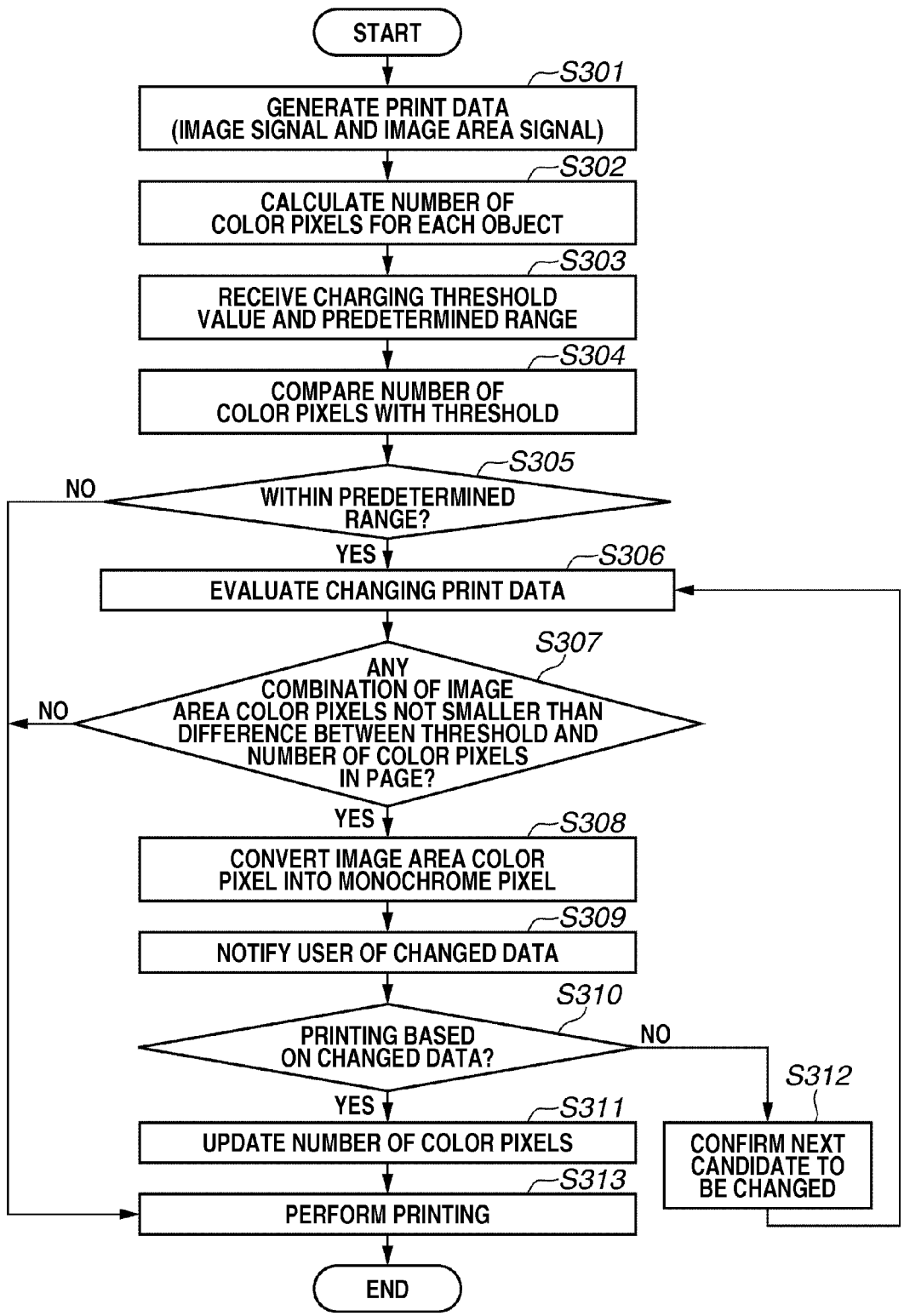
FIG. 15 is a flowchart illustrating an example of print control processing.
Figure 21:
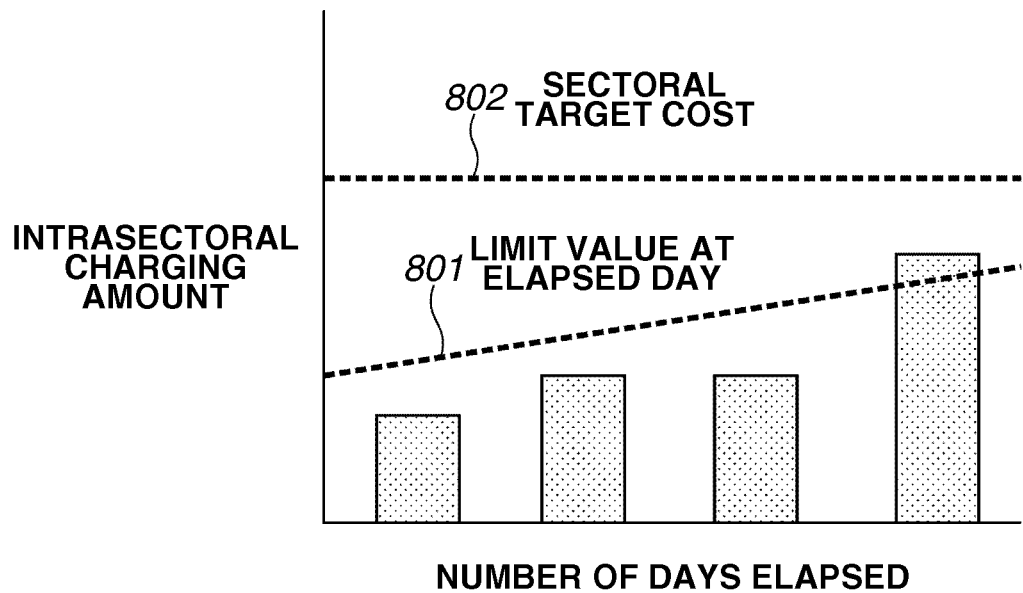
FIG. 21 is a graph illustrating a timing for enabling the processing illustrated in FIG. 15.

Next, a determination about the timing for enabling the processing in the flowchart illustrated in FIG. 15 is described in detail below with reference to FIG. 21.

It is general to manage the charging fee for each section (or division) in a company. Therefore, a sectoral target cost 802 during a predetermined term is set beforehand in the MFP 1000 or the like. In the present exemplary embodiment, it is presumed that the MFP 1000 has a function of authenticating a user and a function of determining a section to which the authenticated user belongs.

Additionally, the data stored in the MFP 1000 includes a sectoral target limit value 801 provided for each number of days elapsed. When a predetermined number of days have elapsed, if the fee, which is integrated in the determination result storage unit 105, of the section to which the user belongs exceeds the target limit value 801, the CPU 101 performs control to execute the processing illustrated in FIG. 15. More specifically, the MFP 1000 according to the present exemplary embodiment determines whether to convert color pixels into monochrome pixels as illustrated in FIG. 15 while taking the present charging state of the section, to which the user who performs printing belongs, into consideration.

Further, the CPU 101 can sets ON or OFF with respect to the execution of the processing illustrated in FIG. 15 based on a user operation input via the operation unit 102.

According to the above-described present exemplary embodiment, a system in which a charging fee is determined using multistage threshold values can monochromate color pixels for each object with reference to a difference between the number of current color pixels and a threshold value. Thus, the present exemplary embodiment can reduce the charging fee and allow a user to select a desired charging fee while confirming an output image.

Additional embodiments of the present invention can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Applications No. 2012-245648, filed Nov. 7, 2012, and No. 2013-013319, filed Jan. 28, 2013, hereby incorporated by reference herein in their entirety.

What is claimed is:

1. An image processing apparatus comprising:
a determination unit configured to determine whether a color amount of an input image is in a first segment, a second segment, or a third segment;
a control unit configured to cause a display screen to display a segment determined by the determination unit; and
an image processing unit configured to monochromate at least one of a plurality of color objects included in the input image so that the color amount of the input image is in a changed segment if an instruction to change a displayed segment is received from a user.

2. The image processing apparatus according to claim 1, wherein the first segment is less than a first threshold value, the second segment is greater than or equal to the first threshold value and less than a second threshold value, and the third segment is greater than or equal to the second threshold value.

3. The image processing apparatus according to claim 1, wherein the displayed segment is the third segment and the changed segment is the second segment.

4. The image processing apparatus according to claim 1, wherein
the control unit is configured to inquire of a user which portion of the input image is to be reduced in the color amount if an instruction to change the segment is received from the user, and
the image processing unit is configured to determine a portion based on a result of the inquiry, and perform monochromating processing on the determined portion.

5. The image processing apparatus according to claim 1, wherein
the control unit is configured to inquire of a user about a pixel having which image area of the input image is to be reduced in the color amount if an instruction to change the segment is received from the user, and
the image processing unit is configured to determine an image area based on a result of the inquiry, and perform monochromating processing on the determined image area.

6. The image processing apparatus according to claim 1, wherein
the determination unit is configured to divide the input image into a plurality of blocks, calculate a mean color difference value of each block, determine the block as a color block if the calculated mean value exceeds a threshold value, determine the block as a monochrome block if the calculated mean value does not exceed the threshold value, and designate the number of blocks having been determined as color blocks as the color amount.

7. The image processing apparatus according to claim 1, wherein a display based on a segment determined by the determination unit includes a display of a fee corresponding to the segment determined by the determination unit.

8. A method comprising:
determining whether a color amount of an input image is in a first segment, a second segment, or a third segment;
performing control to cause a display screen to display the determined segment; and
monochromating at least one of a plurality of color objects included in the input image so that the color amount of the input image is in a changed segment if an instruction to change a displayed segment is received from a user.

9. The method according to claim 8, wherein the first segment is less than a first threshold value, the second segment is greater than or equal to the first threshold value and less than a second threshold value, and the third segment is greater than or equal to the second threshold value.

10. The method according to claim 8, wherein the displayed segment is the third segment and the changed segment is the second segment.

11. The method according to claim 8, wherein
the control includes inquiring of a user which portion of the input image is to be reduced in the color amount if an instruction to change the segment is received from the user, and
the image processing includes determining a portion based on a result of the inquiry, and performing monochromating processing on the determined portion.

12. The method according to claim 8, wherein
the control includes inquiring of a user about a pixel having which image area of the input image to be reduced in the color amount if an instruction to change the segment is received from the user, and
the image processing includes determining an image area based on a result of the inquiry, and performing monochromating processing on the determined image area.

13. The method according to claim 8, wherein
the determining includes dividing the input image into a plurality of blocks, calculating a mean color difference value of each block, determining the block as a color block if the calculated mean value exceeds a threshold value, determining the block as a monochrome block if the calculated mean value does not exceed the threshold value, and designating the number of blocks having been determined as color blocks as the color amount.

14. The method according to claim 8, wherein a display based on the determined segment includes a display of a fee corresponding to the determined segment.

15. A non-transitory computer-readable storage medium storing computer-executable instructions for causing a computer to execute a method according to claim 8.

* * * * *